United States Patent [19]
Tomitsuka et al.

[11] Patent Number: 5,566,271

[45] Date of Patent: Oct. 15, 1996

[54] CONTROL APPARATUS FOR ELECTRONIC EQUIPMENT

[75] Inventors: Hidemi Tomitsuka; Asako Tamura, both of Kanagawa; Yasuhiro Chigusa; Shiro Omori, both of Tokyo, all of Japan

[73] Assignee: Sony Corporation, Tokyo, Japan

[21] Appl. No.: 228,923

[22] Filed: Apr. 18, 1994

Related U.S. Application Data

[63] Continuation of Ser. No. 815,157, Dec. 31, 1991, abandoned.

[30] Foreign Application Priority Data

Jan. 12, 1991 [JP] Japan ..................... 3-013758

[51] Int. Cl.⁶ ........................................... G10L 3/00
[52] U.S. Cl. ..................... 395/2.84; 395/2.55; 395/2.67
[58] Field of Search ..................... 395/2, 12, 2.79, 395/2.84, 2.55, 2.67, 152; 381/48; 364/419.2; 345/122

[56] References Cited

U.S. PATENT DOCUMENTS

| | | | |
|---|---|---|---|
| 4,104,625 | 8/1978 | Bristow et al. | 381/48 |
| 4,305,131 | 12/1981 | Best | 395/2 |
| 4,333,152 | 6/1982 | Best | 395/2 |
| 4,445,187 | 4/1984 | Best | 395/2 |
| 4,569,026 | 2/1986 | Best | 395/2 |
| 4,736,447 | 4/1988 | Korinsky | 382/69 |
| 4,969,194 | 11/1990 | Ezawa et al. | 395/2 |
| 5,086,385 | 2/1992 | Launey et al. | 364/188 |
| 5,111,409 | 5/1992 | Gasper et al. | 395/152 |

FOREIGN PATENT DOCUMENTS

| | | |
|---|---|---|
| 075026 | 4/1982 | European Pat. Off. . |
| 313976 | 10/1988 | European Pat. Off. . |
| 369430 | 11/1989 | European Pat. Off. . |
| 3918298 | 12/1990 | Germany . |
| 2220290 | 6/1989 | United Kingdom . |

OTHER PUBLICATIONS

Patent Abstract of Japan, vol. 12, No. 385, Oct. 14, 1988 (63- 129725).

*Primary Examiner*—Allen R. MacDonald
*Assistant Examiner*—Richemond Dorvil
*Attorney, Agent, or Firm*—Jay H. Maioli

[57] ABSTRACT

An instruction for operation mode control of a VTR 40 and information on the video recording reservation is voice inputted. The voice input is recognized by a voice recognition circuit 13 and is fed to a control circuit 15. The control circuit 15 controls the VTR 40 in response to the instruction or information of the voice input and causes an animation character generating circuit 16 to generate a video image of an animation character AC for displaying it on the screen of a CRT display 30. A message from the animation character AC is voice synthesized in a voice synthesizing circuit 19 and the synthesized voice is outputted from a speaker 20.

The electronic equipment can be operated as if the user were talking with the animation character, so that a natural man-machine interface can be realized.

10 Claims, 17 Drawing Sheets

CONTROL APPARATUS FOR ELECTRONIC EQUIPMENT

This is a continuation of application Ser. No. 07/815,157 filed Dec. 31, 1991 now abandoned

BACKGROUND OF THE INVENTION

1. Field of the Invention

The present invention relates to a control apparatus and in particular to a control apparatus for electronic equipment for making a reservation for video recording or for directly controlling the electronic equipment such as a video cassette recorder.

2. Description of the Prior Art

Various recent home appliances such as video cassette recorders have a multiple of functions. Various switches for setting various operation modes are provided on the main body of the appliance. The operation of those switches is complicated. Even if the switches are few in number, the operation process is complicated. Accordingly, few users can freely use timer function for making a reservation of the video recording of the VTR.

Various approaches have been proposed to make the operation of such the appliances easier. For example, the bar code reader is used to simplify the input operation. Instructions and various items of information are inputted in natural language, that is, in human voice from a microphone. The approach relying on the bar code reader has a low degree of freedom, since bar code labels which indicate various items of information of a program to be reserved should be provided. The application range of this approach is limited. Therefore, it is considered that the approach relying on the natural language is favorable.

In a voice input operated apparatus in which operation instructions for designating the operation modes of the information recording/reproducing apparatus such as a VCR or VTR can be inputted in human voice, a voice input device has been proposed which is capable of stably controlling the VCR by generating control commands to the VCR with reference to the status data of the information recording/reproducing apparatus.

A control data input device has been proposed which is capable of controlling an object by analyzing the natural language which is formed of a combination of words representing a plurality of control instructions to provide the object to be controlled with a control instruction.

Although these techniques are able to set and control the operation mode of the appliances such as a VTR, there is much room for improvement in response to an input. Only numerals and characters representative of the content of the reservation are displayed as the data train on a display panel. Preliminary knowledge is necessary to deal with the case in which correction is made in the course of input or the complete reservation cannot be made. Every user cannot easily operate the VCR. Many users find it difficult to accept data comprising only a numeral train. An improvement in man-machine interface has been demanded.

The present invention has been made under the above mentioned circumstances. It is an object to provide a control apparatus of electronic equipment which make it possible for everybody to easily operate the appliance and which provide a natural man-machine interface.

SUMMARY OF THE INVENTION

In order to accomplish the above mentioned object, the present invention provides a control apparatus for electronic equipment for designating the operation mode thereof, comprising: voice inputting means having an acoustic-electric transducer for voice inputting instructions and various items of information to designate the operation mode and for outputting an electric voice signal; voice recognition means for processing an output signal from the voice inputting means to recognize the instruction and various items of information; animation character generating means for outputting a video signal of an animation character who is a message speaker; video image display means for display the video signal from the animation character generating means; voice synthesizing means for synthesizing the voice signal of the message in response to a message signal input; voice outputting means for outputting the voice signal from the voice synthesizing means in voice; and control means responsive to at least the output signal from the voice recognition means for outputting an operation mode designation and control signal for designating the operation mode of said electronic equipment, an action control signal for controlling the action of the animation character and a message signal instructing a message voice which is desired to be synthesized in the voice synthesizing means.

In accordance with the present invention, electronic equipment is controlled in response to a voice input of natural language. At this time, a voice message corresponding to a message signal is outputted from voice output means and an animation character displayed on video display means is moved in synchronization with the message voice. Accordingly, it sounds as if the character spoke the message. Thus, the user feels as if the user were talking with the character.

In a control apparatus for electronic equipment of the present invention, instructions and Various items of the information for designating the operation modes are inputted in voice and are converted into electrical signals and then processed to recognize the instructions and the various items of information. The operation mode of the electronic equipment is designated in response to the recognized voice inputs. An animation character which will be a speaker of a message is displayed on video display means and the action of the character is controlled. A message voice is synthesized in response to the message signal output. The electronic equipment can be controlled in response to the voice input of natural language so that everybody can easily control the electronic equipment. A natural man-machine interface which makes the users feel as if they were talking with the animation character and enables the users to easily operate the equipment can be realized.

DESCRIPTION OF THE PREFERRED EMBODIMENTS

Now, the preferred embodiments of the present invention will be described with reference to the drawings.

Figure 1:
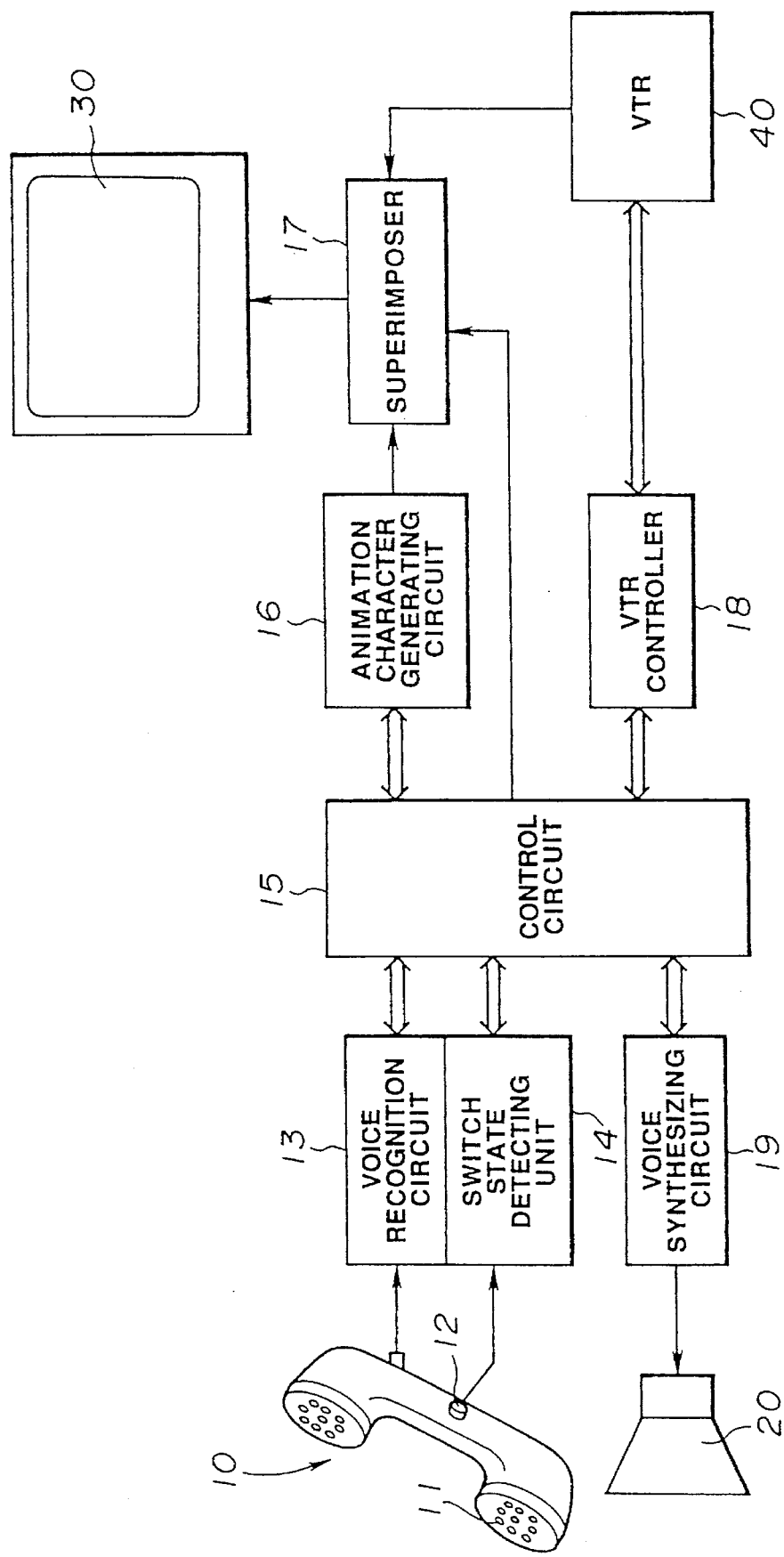
FIG. 1 is a block diagram showing the schematic structure of an embodiment of a control apparatus of the present invention.

A control apparatus for electronic equipment of the present embodiment is a control apparatus for electronic equipment for controlling the selection of the operation mode of electronic equipment such a video tape recorder (VTR) 40 as shown in FIG. 1 . In the present embodiment, the VTR 40 is used as the electronic equipment. The present embodiment will be described with reference to controls such as the selection control of various operation modes of the VTR 40 such as recording, playback, fast feeding and rewinding and recording reservation.

In the apparatus of the present embodiment of FIG. 1, a handset 10 which is similar to a telephone handset is provided as the voice input means for inputting instructions for selection control of operation modes and various items of information by voices. A transmitter unit 11 of the handset 10 is provided with an acoustic-electrical conversion element for converting an input voice into an electrical signal and outputting it. A press-to-talk switch 12 for dividing inputs by switching the voice input mode is provided in the vicinity of the transmitter unit 11. An output signal from the transmitter unit 11 of the handset 10 is fed to a voice recognition circuit 13 in which it is signal processed for recognizing the instruction and various items of information. An output signal from the switch 12 is fed to a switch state detecting unit 14 for detecting the on/off state of the switch. The voice recognition circuit 13 and the switch state detecting unit 14 are connected with a control circuit 15. With the control circuit 15 are connected an animation character generating circuit 16 for outputting a video signal of an animation character which will become a message speaker, a voice synthesizing circuit 19 for synthesizing the voice signal of the message in response to a message signal input by using a technique of ruled voice synthesizing, and a VTR controller 18 for controlling the selection of the operation mode of the VTR 40. A video signal from the character generator 16 is fed to a superimposer 17 in which it is superimposed upon the video signal from the VTR 40 and then the superimposed signal is fed to a cathode ray tube (CRT) display 30. A voice signal from the voice synthesizing circuit 19 is fed to a speaker 20 in which it is converted into a sound. The speaker 20 and the CRT display 30 may be formed into an integral television receiver circuit.

The control circuit 15 outputs at least an operation mode selection control signal which controls the selection of the operation mode of the VTR 40 in response to an output signal from the voice recognition circuit 13, an action control signal for controlling the action of the animation character AC of the animation character generating circuit 16, a message signal for instructing a message voice which is desired to be synthesized in the voice synthesizing circuit 19 and comprises a CPU such as a microprocessor. The control circuit 15 selects and outputs one control instruction which is appropriate for the current operation state of the VTR 40 from a plurality of control instructions in response to an instruction for the selection control of the operation mode recognized by the voice recognition circuit 13. The selection processing and the operation mode of the VTR 40 will be described hereafter in detail. The control circuit 15 outputs a message signal instructing a message which is optimal as the content of a response in response to an voice input content (and further in response to the current state) and feeds the output message signal to the animation character generating circuit 16 and the voice generating circuit 19.

In FIG. 1, the transmitter unit of the handset 10 converts a voice pronounced by a man such as an operator operating the VTR 40, that is, a user) into an electrical voice signal. The voice pronounced by the operator includes pronounced instruction words, such as "playback", "stop", "record", "pause", "slow", "fast-feeding", "rewind" and pronounced words such the day of the week (Sunday to Monday), every day, every week, channel (channels 1 to 12), starting/ending time (morning, afternoon, 0 to 12 o'clock) for making a reservation of video recording. In the present embodiment, the other words "Hey", "O.K.", "No" in addition to the above mentioned words can be inputted as voices.

The press-to-talk switch 12 for designating the voice input state disposed in the handset 10 instructs the division of words pronounced by the operator by being turned on or off by the operator. In other words, the press-to-talk switch 12 is provided to divide an input voice signal of a sentence comprising plural continuous discrete words into units to be processed by voice recognition in the voice recognizing circuit 13. An output from the press-to-talk switch 12 is fed to the switch state detecting unit 14 which is provided in parallel with the voice recognition circuit 13. The switch state detecting unit 14 generates a state instruction signal instructing the current on/off state in response to an output signal from a press-to-talk switch 12. The state instruction signal assumes states "0" and "1" when the press-to-talk switch 12 is in the inoperative and operative states, respectively. Accordingly, if voice recognition is desired to be conducted, the press-to-talk switch 12 is turned on and is turned off after completion of the voice input. The voice recognition in processing units is thus performed in response to the corresponding state instruction signal. Accordingly, it will suffice for the voice recognition circuit 13 not to analyze whether or not the input is completed from the turning off (state "0") representative for the completion of the voice word input when continuous word inputting is performed by voice. In other words, the voice recognition circuit 13 can determine clear starting and completion time when the voice is recognized. The range in which the voice can be recognized can be easily determined by a software so that it will need not to perform an unnecessary voice recognition processing for the noises outside this range. Since control of the handset 10 is not performed, noises on switching of voice input (on cutting off of voices) will not be inputted.

A sense of reluctance or incompatibility to speak to a machine can be mitigated by feeding a voice or speech output signal from the voice synthesizing circuit 19 to the receiver unit of the handset 10 and performing input and output of voice via the handset 10 which is similar in shape to the telephone handset and malfunction upon use at a noisy place can be prevented. Responded voice can be shielded from co-receiving listeners by feeding the responded voice signal to only the receiver unit of the handset 10 without feeding responded voice to the speaker 20 in the TV set or stereo receiver. Video recording reservation presetting operation and VTR operation can be performed without interfering with the other listeners.

Figure 2:
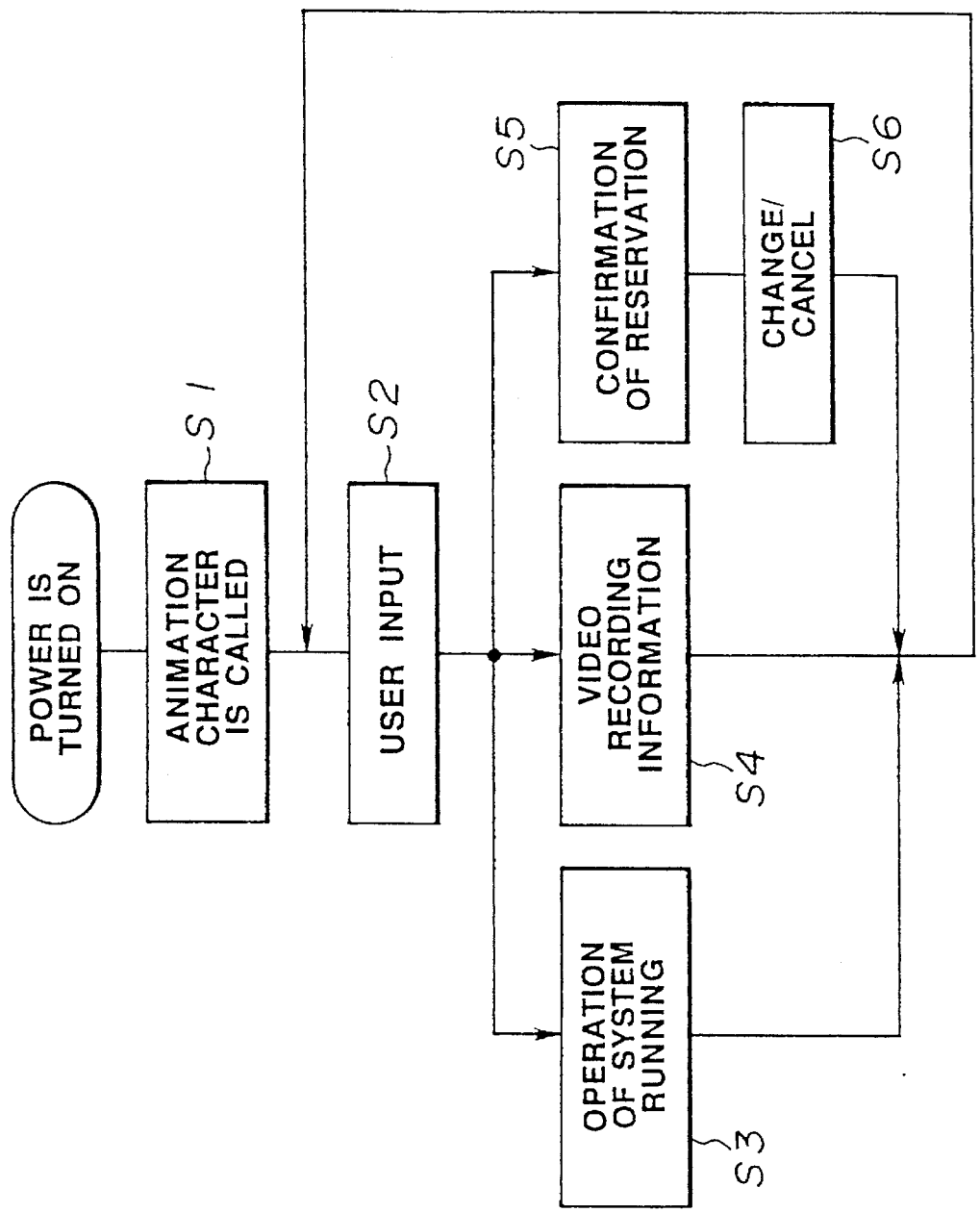
FIG. 2 is a flow chart showing a main operation of the control apparatus of the present invention.
Figure 3:
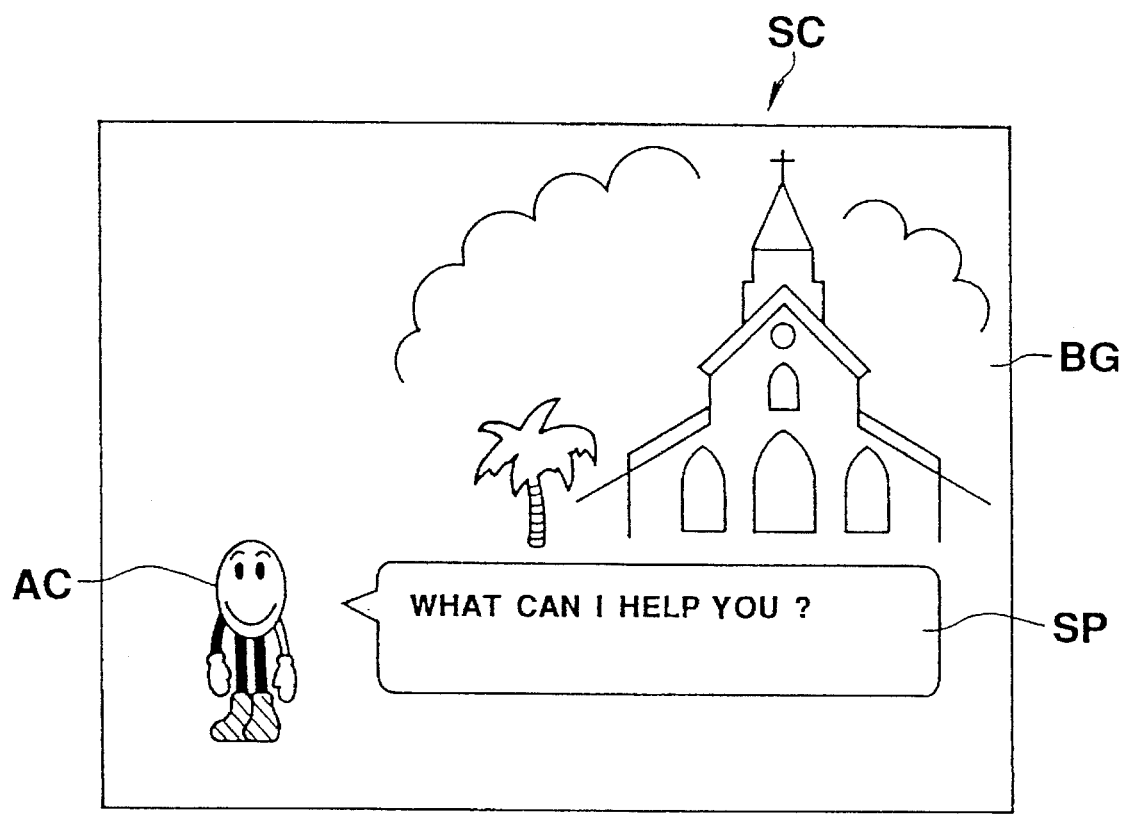
FIG. 3 is a schematic view showing a CRT screen on which an animation character and a balloon in an initial state are displayed.

A flow chart of main operations in the apparatus of the present embodiment is shown in FIG. 2. In FIG. 2, an animation character is called in the initial state after the power to the apparatus has been turned on by carrying out the voice input or the other input operation at step S1 by an operator (user), the animation character AC as shown in FIG. 3 is displayed on a screen SC of the CRT display 30 and the apparatus is brought into a stand-by state of a voice input by the operator. That is, the animation character AC and a balloon SP for character displaying the content spoken by the animation character are superimposed upon the video signal from the VTR 40, a background video image and displayed. A message that is the same as the message in the balloon SP (for example, a message "What can I help you with?" representing the stand-by state) is synthesized in the voice synthesizing circuit 19 simultaneously with the display of the message on the screen SC and the voice (for example "What can I help you with?") is generated from the speaker 20. A calling processing at the step S1 is specifically exemplarily shown. When the name of the animation character AC (for example, Ivy) is called or a call "Hey" is made, or the power of the VTR 40 is turned on, the animation character AC is displayed together with a message "Yes, here is Ivy." More natural atmosphere of dialogue is obtained by subsequently shifting to the state of FIG. 3.

The operator (user) voice inputs an instruction and various items of information for the selection control of the operation mode at step S2. If the instruction is an instruction to activate the system for running the VTR 40, the program step proceeds to step S3, the apparatus is brought into a phase to directly control the operation mode of the VTR 40. If the instruction is to reserve the video recording, the apparatus is brought into a mode of the video reserving operation of the VTR 40. If the instruction is to confirm the reservation, the program step will proceed to a step S5 in which the apparatus is brought into a mode to confirm the reserved content. In the mode to confirm the reservation, the program step will proceed to the step 6 subsequently of the step 5 in which processing to change or cancel the reservation is made. In the modes to reserve the video recording and to confirm the reservation, more sophisticated conversation between the operator and the animation character AC is carried out as will be described. After completion of processing at steps S3, S4 and S5 (S6), the apparatus is returned into the stand-by state of a voice input.

In an example of display in FIG. 3, the animation character AC is displayed in the left and lower area on the screen SC of the CRT display 30. If the animation character AC is displayed in the center of the screen SC, it will become a visual obstacle to a video image (background video image BG) displayed on the screen. An animation character AC displayed in the lower and left of the screen will not become an obstacle for the image on the screen. A character is displayed in the lower area of the screen SC, the legs of the character AC will not be levitated so that it will give a stable feeling. If the character AC is displayed on the lower and left side of the screen SC, a sense of incompatibility is less from the standpoint of a human being. The balloon SP to display a message in the screen SC is displayed in the lower and right areas of the screen SC if the characters of the message are an array in a horizontal direction from the left to right and in a vertical direction from the upper to lower side, respectively. This will scarcely obstruct the image (background video image BG) on the screen SC.

An animation action control signal is fed to the animation character generating circuit 16 from the control circuit 15 so that the action of the animation character AC is controlled. The animation character generating circuit 16 which receives the action control signal from the control circuit 15 outputs to the superimposer 17 a video signal which causes the animation character AC as shown in FIG. 3 which is a speaker talking with the operator to move his or her mouth in response to the voice output of the message. The animation signal includes a signal of a balloon SP for character displaying the message. The superimposer 17 superimposes the video image of the animation character AC upon the reproduced video image from VTR 40 and feeds it to the CRT display 30. The animation character AC displayed on the screen of the CRT display 30 is made a personified expressive character having familiarity. This causes the operator (user) to have a feeling as if he or she were talking with the animation character (or electronic equipment).

The voice recognition circuit 13 in FIG. 1 recognizes the above mentioned instructions and various items of information by processing the supplied voice signal and may be variable in structure. A voice recognition circuit having a structure as shown in FIG. 4 will be described.

Figure 4:
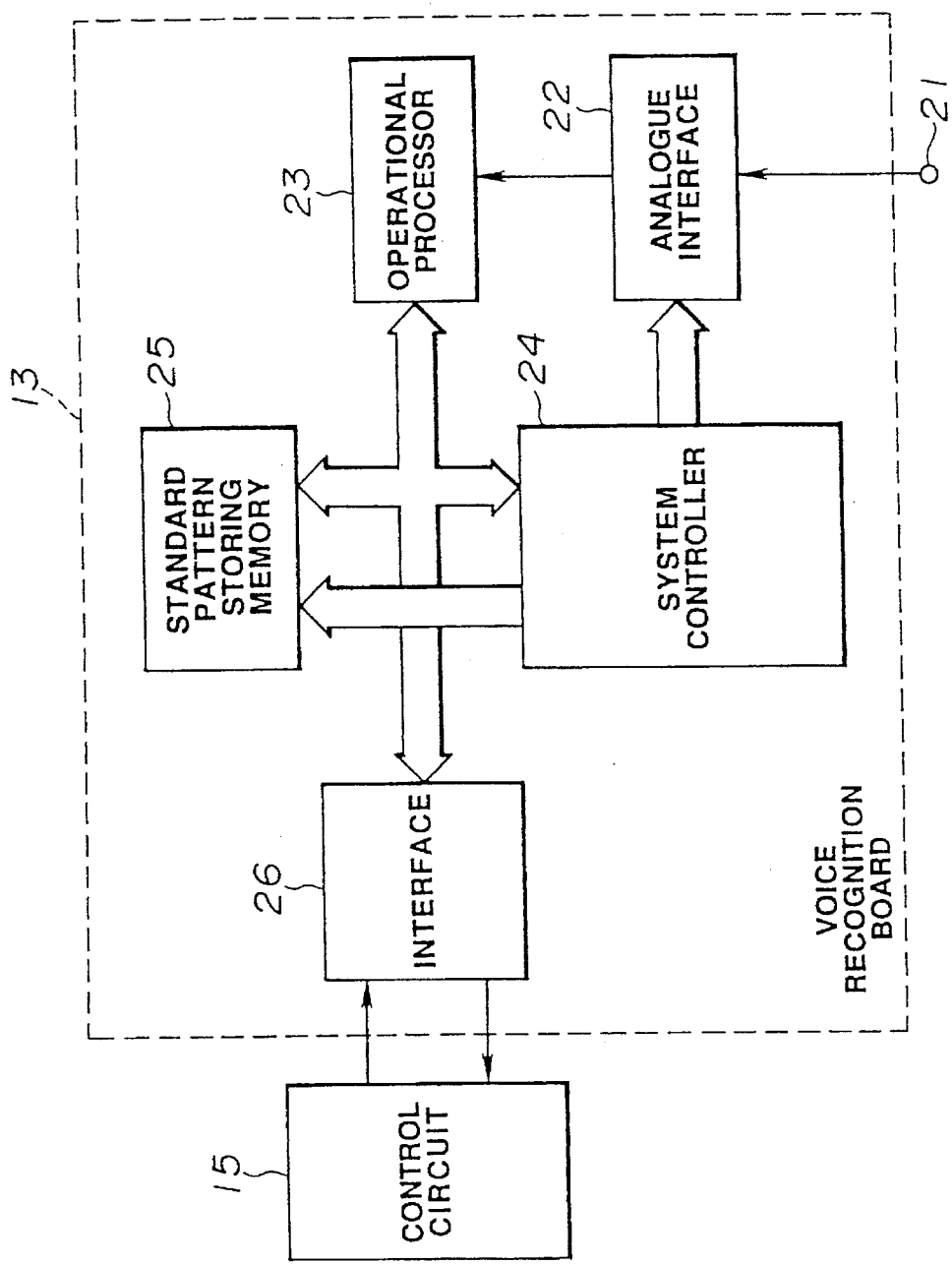
FIG. 4 is a block diagram showing a structure of a voice recognition circuit.

In FIG. 4, an output signal (input voice signal) from the transmitter unit 11 of the handset 10 is supplied to the input terminal 21 and the input voice signal is fed to an operational processor 23 via an analog interface 22. After the analog interface 22 changes the input voice level to a given level depending upon a control data supplied from a system controller 24 and then converts the voice signal into serial digital voice signals and feeds them to the operational processor 23. The operational processor 23 forms a voice pattern by frequency analyzing the inputted digital voice signals and corrects (time axis normalizes) the time distortion of the voice pattern due to changes in speaking speed of the human voice and compares the time axis normalized voice pattern with a plurality of standard patterns preliminarily stored in a standard pattern storing memory 25 for conducting a so-called pattern matching processing. The pattern matching processing is to calculate the distances between the detected voice pattern and each of the standard patterns and to determine a standard pattern which has the shortest distance from the detected voice pattern. The result of processing is fed to the control circuit 15 including the CPUs via the interface 26. A plurality of patterns of the above mentioned words of instructions such as "playback", "stop" and various items of information such as "Sunday", "channel 1" are stored in the standard pattern storing memory 23. The operational processor 23 recognizes the words by determining which the voice pattern of the input voice signal is of the plurality stored patterns (to which the voice pattern of the input voice signal is the nearest). Although the plurality of standard voice patterns may be stored in the standard pattern storing memory 25 by a manufacturer, or alternatively prior to starting to use the apparatus, these patterns may be stored the memory 25 by successively voice inputting the words by an operator and by frequency analyzing the input voice by the operational processor 23 to form the voice patterns.

The output signal from the voice recognition circuit 13 is fed to the control circuit in which it is subjected to a natural language input processing or inference dialogue processing.

A natural language input processing production system 32 functions in response to a voice input 31 from the user to form a meaning frame 33 depending upon the number of the reserved programs. The meaning frame 33 is fed to the inference dialogue production system 34 to preset and control a video recording reserving scheduler 35. The natural language input processing production system 32 can be divided into a sentence normalizing production system PS1, dividing production system PS2, a language extracting production system PS3, and meaning understanding production system PS4. The inference dialogue production system 34 can be divided into an interpolation inference production system PS5, a custom learning production system PS6 and a dialogue processing production system PS7. Slots of a plurality of items such as an item of information on the day of the week, an item of information on channel, an item of information on starting time, an item of information on recording period of time or ending time are provided as video recording reserving information in one meaning frame 33. Various items of information which have been voice inputted in the reservation processing are written into corresponding item slots.

Figure 6:
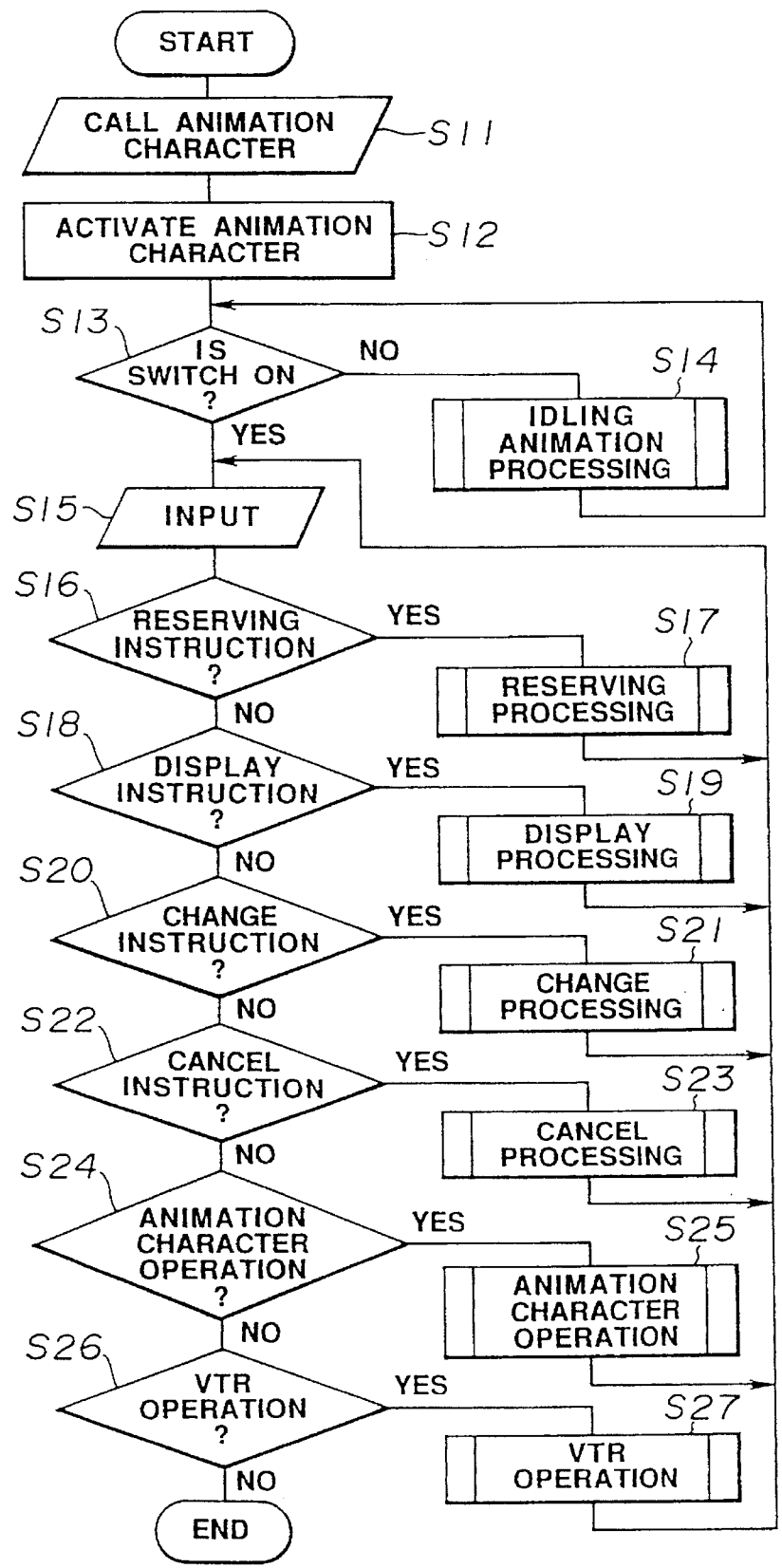
FIG. 6 is a flow chart showing the detail of the processing at each step in the flow chart of FIG. 2.

FIG. 6 is a flow chart explaining the processing at each step in the flow chart in FIG. 2. A case in which the video recording reservation and operation of the running system of the VTR 40 is shown.

That is, an operation to call the animation character AC at step S1 in FIG. 2 is carried out at step S11 in FIG. 2. The call at step S11 is made in response to an voice input of calling instruction "IVY" or "Hey" or the turning on of the power to the VTR 40 as described at step S1 in FIG. 2. When a call for the animation character AC is inputted at the step S11, the program step will proceed to next step S12 and the animation character AC as shown in FIG. 3 is displayed on the screen SC of the CRT display 30 (activation of the animation character AC).

Determination whether the press-to-talk switch 12 is turned on or off is made at step S13. If the switch is turned off, the program step will proceed to step S15. When an instruction from the operator is voice inputted, determination whether or not the input instruction is an instruction to reserve the video recording is made at step S16. If the instruction is an instruction to reserve the video recording (Yes), the processing of reservation of the video recording is carried out at step S17 and then the program step will return to step S15. If No (the input instruction is not to reserve the video recording) at step S16, the program step will proceed to step S18 at which determination whether or not the input instruction is an instruction to display the content of the video recording reservation which has been already carried out is made. If Yes at step S18, processing to display the previous content of video recording reservation on the screen SC of the CRT display 30 is carried out at steps 19 and thereafter the program step will return to the step S15.

If No, the program step will proceed to step 20. Determination whether or not the input instruction from the operation in an instruction to change the video recording reservation is made at step 20. If Yes at step S20, the video recording reservation is changed at step S21 and then the program step will return to step S15. If No, the program step will proceed to step S22. Determination whether or not the input instruction is an instruction to cancel the video recording reservation is made at step S22. If Yes, to cancel the video recording reservation is made at step S23 and the program step will return to step S15. If No, the program step will proceed to step S24. Determination whether or not the input instruction is an instruction to operate the animation character AC is made at step S24. If Yes, the program step will return to the step S15 after the animation character AC is operated. The operation of the animation character specifically includes deletion of the animation character AC on the screen SC and cancellation of voices. If No at step S24, the program step will proceed to step S26. Determination whether or not the instruction is to operate the VTR 40 is made at step S26. If Yes, processing to operate the VTR 40 is carried out at step S15. If no, processing is terminated.

If there has been no voice instruction input from the operator within a given period of time at step S14, an appearance in which the animation character AC does not know what to do with himself is displayed. Specifically, actions in which the animation character AC firstly yawns and then leans upon the left end of the screen or scratch himself on his own head are made. If there has been no voice instruction input subsequently, an action in which the animation character AC lies down is made. Processing for this action will be hereafter referred to as processing for idling action.

Figure 7:
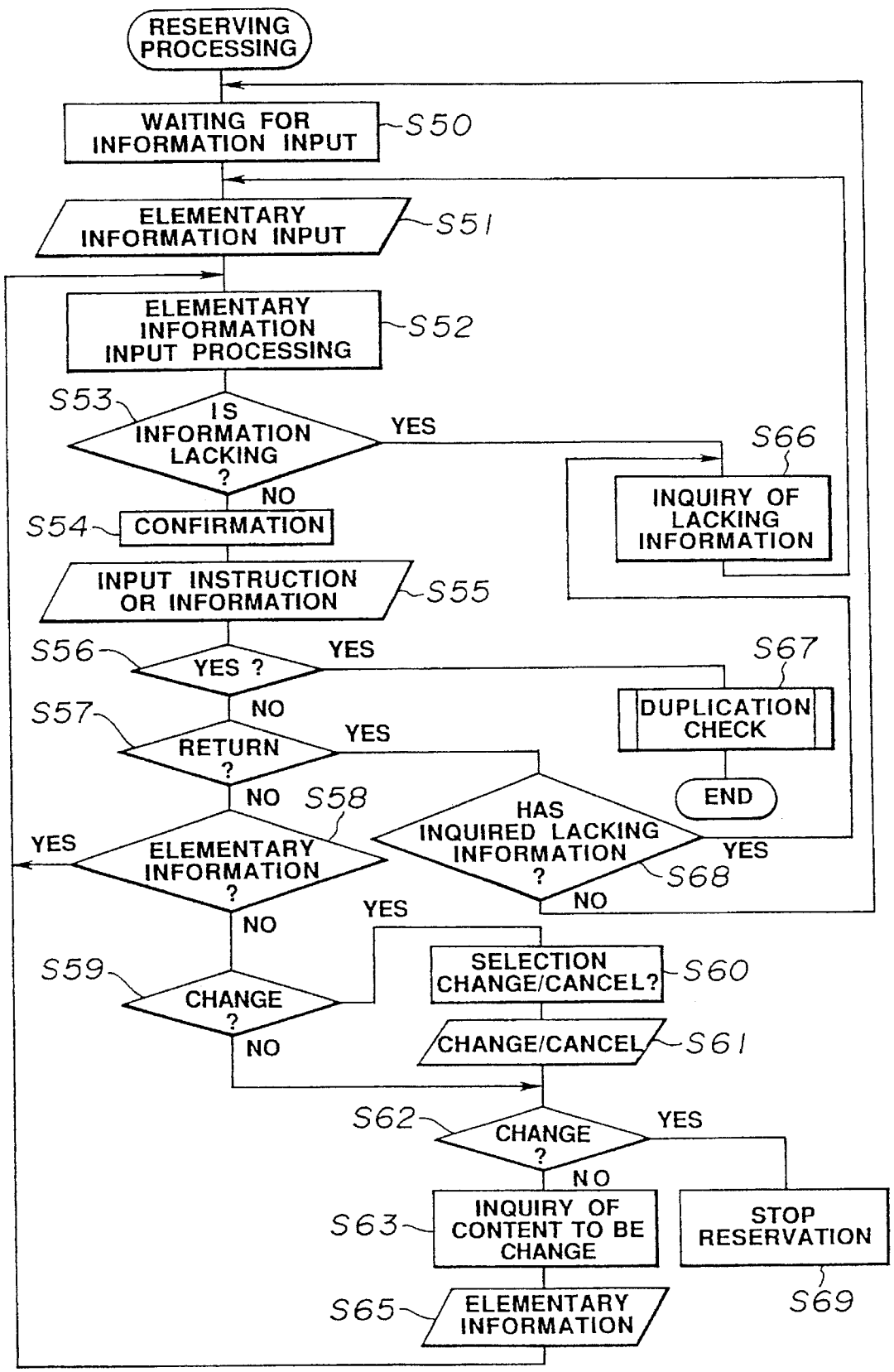
FIG. 7 is a flow chart showing the detail of the reservation processing in the flow chart of FIG. 6.

FIG. 7 is a flow chart explaining the details of the reserving processing at step S17 of FIG. 6. That is, in FIG. 7, a reservation input request representative of waiting for information on the video recording reservation is displayed at step S50. The animation character AC and a character message "Please, make a reservation" in the balloon are displayed on the screen SC of the CRT display 30. At this time, a synthesized voice "Please, make a reservation" is pronounced and simultaneously with this, a moving picture in which the mouth of the animation character AC moves is displayed. In an example of FIG. 8, characters "reservation" representing the current mode are displayed in a character display window PH in the right and upper position of the screen SC.

Figure 5:
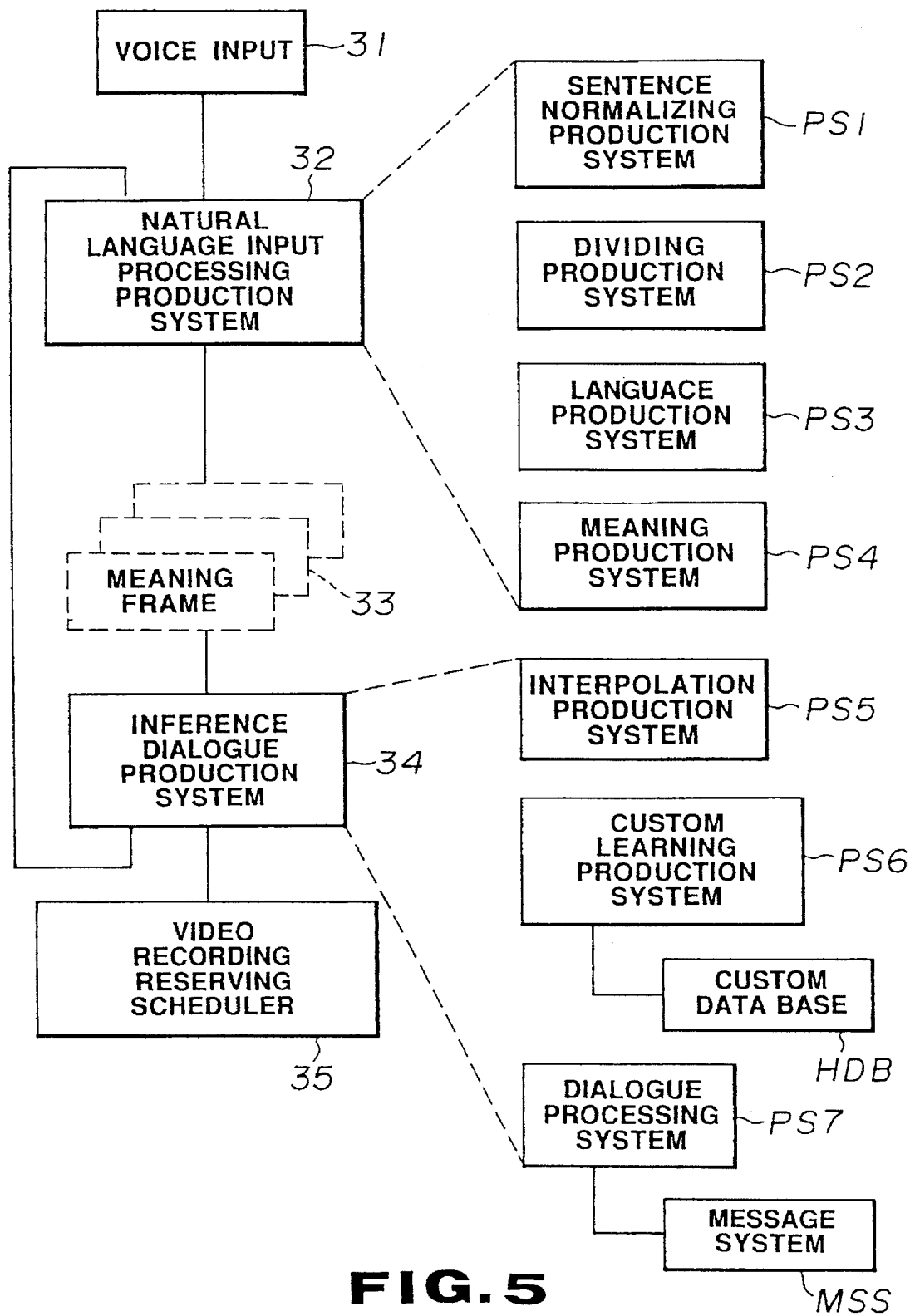
FIG. 5 is a block diagram explaining the function of a control circuit.
Figure 8:
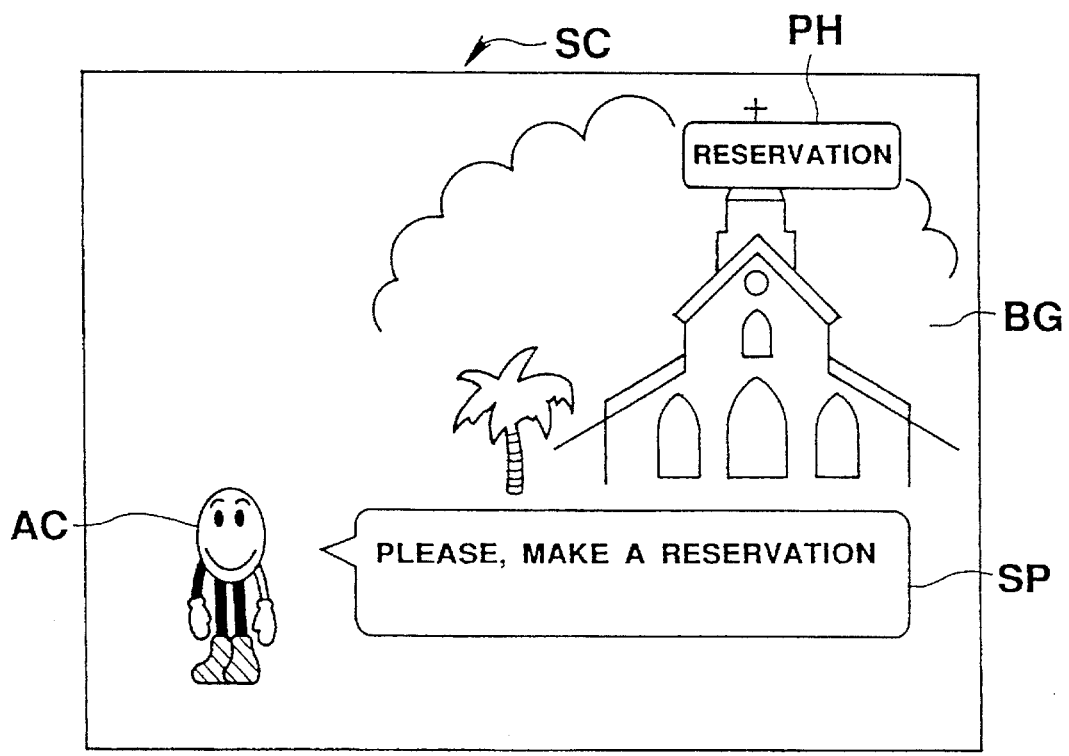
FIG. 8 is an illustration showing the CRT screen on which a reservation input request is displayed.

Voice input of various items of information such as the day of the week, channel, starting and ending time to make a reservation of the video recording of the VTR 40 is performed at next step S51 in FIG. 7 while the display as shown in FIG. 8 (and voice output) is carried out. A plurality of items of information can be inputted in desired order once at the step S51. Accordingly, input processing relying upon the natural language input processing production system 32 as shown in FIG. 5 is carried out at step S51. After each processing of normalization and division of a sentence, word extracting and meaning understanding has been performed, a plurality of items of information are classified into corresponding slots of items of the meaning frame 33 such as an item of information on the day of the week, an item of information on starting time, an item of information on the recording period of time or ending time.

After performing the information input processing at the step S52, determination whether or not there is any insufficiency of elemental information is made step S53.

Words "insufficiency of information" means that all items of information are not provided in the above-mentioned meaning frame. When four items of information such as the day of the week, the channel, the starting time, and the ending time (or the recording period of time) are provided in the meaning frame on reservation of video recording, a normal video recording reservation cannot be carried out if one of four items is lacking.

If it is determined that the elemental information is lacking (Yes) at step S53, an inquiry on the lacking elemental information is made at step S66 and the program step will return to step S51. Complementary processing of the lacking information will be described hereafter with reference to FIG. 11.

Figure 9:
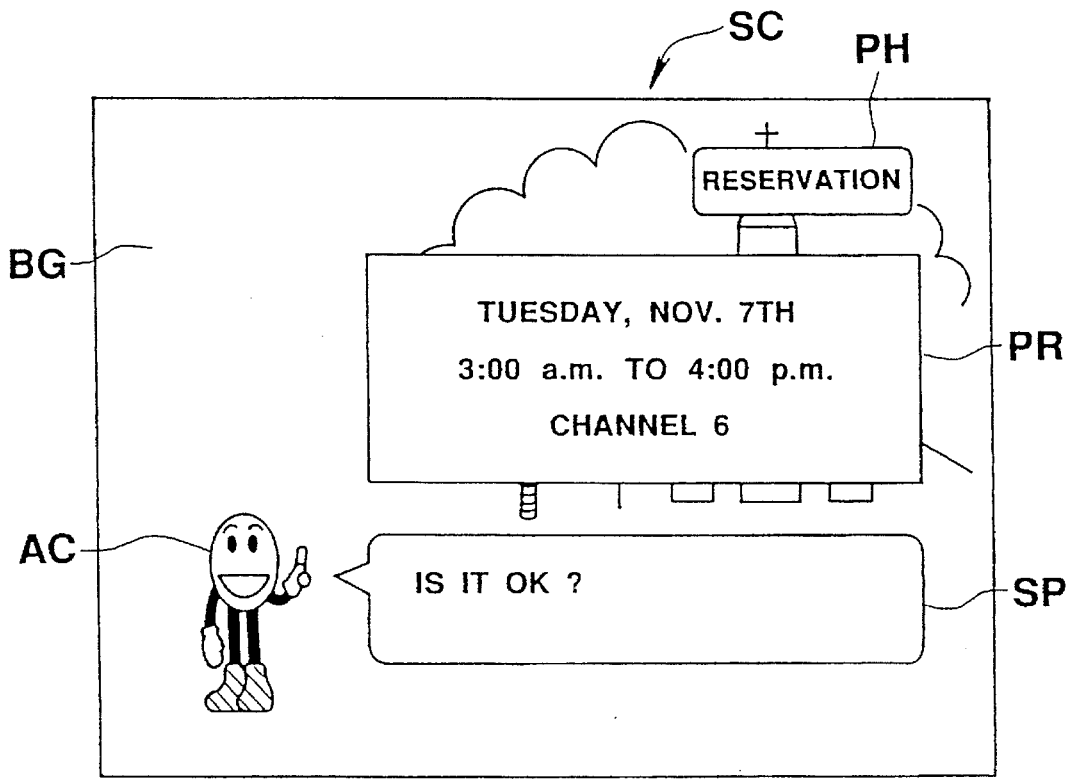
FIG. 9 is an illustration showing the CRT screen on which reserved information confirmation is displayed.

If it is determined at step S53 in FIG. 7 that there is no lack of information (No), the program step will proceed to the step S54 at which each inputted elementary information is confirmed. A display as shown in FIG. 9 is made on the screen SC of the CRT display 30 on confirmation of the elementary information at step S54. The animation character AC and a character message "Is it OK?" in the balloon SP are displayed similar to the case of FIG. 8 and the synthesized voice "Is it OK?" is pronounced simultaneously with the mouth of the animation character AC. Characters "Reservation" representing the current phase are displayed in the character display window H on the screen SC. As the confirmation display of FIG. 9, a window PR for displaying video recording reservation contents is provided in the center of the screen SC. Each item of data in the meaning frame such as data on the date and the day of the week "Tuesday, Nov. 7th" the data on the starting and ending times "3 a.m. to 4 a.m." and the data on the channel "channel 6" are displayed in the display window PR.

Voice input for confirming the reservation at step 54 carried out at next step S55 in FIG. 7 while such a display of FIG. 9 is conducted. Voice input of instructions such as "Yes", "Return", "No" and "Change" or the elementary information is carried out. It is of course noted that the natural language input processing as shown in FIG. 5 is also conducted at this time. Determination whether or not the voice input at step S55 is "Yes" is made at step S56. If it is determined "Yes" (voice "Yes" is inputted), the program step will proceed to step S67 at which it is checked whether or not video recording reservation is duplicated. If it is determined Yes at step S56 (other than voice "Yes"), program step will proceed to step S57. At step S57, determination whether voice input at step S55 is "Return" is made at the step S57. If it is determined at step S68 "Yes", determination whether or not an inquiry on lack of the elementary information is made. If Yes or No at step S68, the program step will return to steps S68 or S50, respectively. If the determination at the step S57 is No, the program step will proceed to the step S58. Determination whether or not voice input at the step S55 is elementary information is made at the step S58. If the voice input is elementary information (Yes), the program step will return to the step S52. If the voice input is a voice input other than the elementary information (No), the program step will proceed to the step S59. Determination whether or not the voice input at step S55 is "Change" is made at step S59. If No, the program step will proceed to step S60. Selection whether each item of elementary information of the video recording reservation is changed or canceled is made at step S60. Accordingly, any input of change/cancel is carried out at step S61 and the program step will proceed to step S62. Determination whether or not the voice input is "change" is made again at step S62. If No, the video recording reservation is stopped at step S69. If Yes at step S62, the program step will proceed to step S63 at which the content of change is inquired. After elementary information is inputted again at step S65, the program step will return to step S52.

Figure 10:
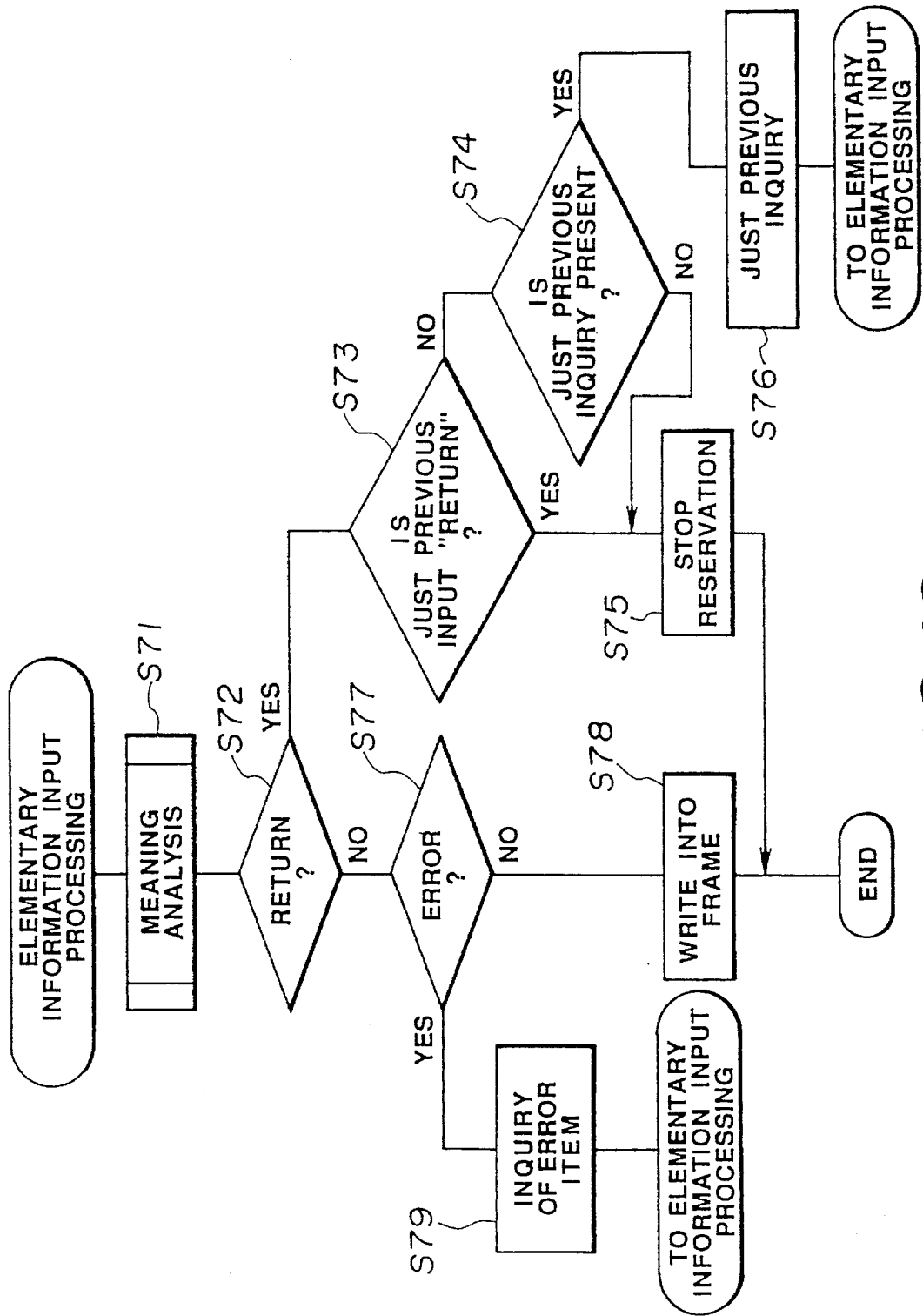
FIG. 10 is flow chart showing the detail of an elementary information input and an elementary information input processing in the flow chart of FIG. 7.

FIG. 10 is a flow chart showing the detail of the elementary information input at step S51 of FIG. 7 and the elementary information input processing at step S52.

FIG. 10 shows the flow of action in consideration of the fact that the natural language "Return" has a plurality of meanings and different controls are necessary depending upon the current condition. In other words, if elementary information is inputted in FIG. 10, the meaning of the inputted elementary information is analyzed at step S71 and the program step will proceed to step S72. Determination whether or not the inputted voice is "Return" is made at step S72. If Yes, the program will proceed to step S73. Determination whether or not the just previous inputted voice is "Return" is made at step S73. If Yes at step S73, the program step will proceed to step S75 at which processing to stop the reservation is performed and then the processing is terminated. If it is determined No at step S73, the program step will proceed to step S74 at which determination whether or not there is any question immediately before is made. If No at step S74, the program step will proceed to step S75 at which the reservation is stopped. If Yes, the program step will proceed to step S76. At step S76, an inquiry just before is made and the program step will return to the elementary information input step of step S51 of FIG. 7. If it is determined No at step S72, the program step will proceed to step S77. Determination whether or not there is any error is made at step S77. If Yes, the program step will proceed to step S79 at which error item is inquired. Then the program step will return to step S51 at which elementary information is inputted. If it is determined No at steps 77, the program step will proceed to step S78 at which writing into the meaning frame is performed and then the processing is terminated.

If a word which has a plurality of meanings like "Cancel" or "OK" other than "Return" is voice inputted, a natural language processing program is incorporated so that the meaning of the inputted word can be correctly interpreted depending upon circumstance to perform processing, that is, to enable to process the diverse meanings of a word. This can be achieved by incorporating the current condition into the object of determination as shown in FIG. 10. This enables the operator to operate the apparatus by the natural language which is used in ordinary life by the operator.

The voice input "Return" or "Cancel" has various meanings also in a phase in which the feeding system of the VTR 40 is directly operated at step S3 of FIG. 2 or the phase of reservation confirmation at step S5 (and S6). A response which is appropriate is taken depending upon the circumstance. This will be described hereafter.

Figure 11:
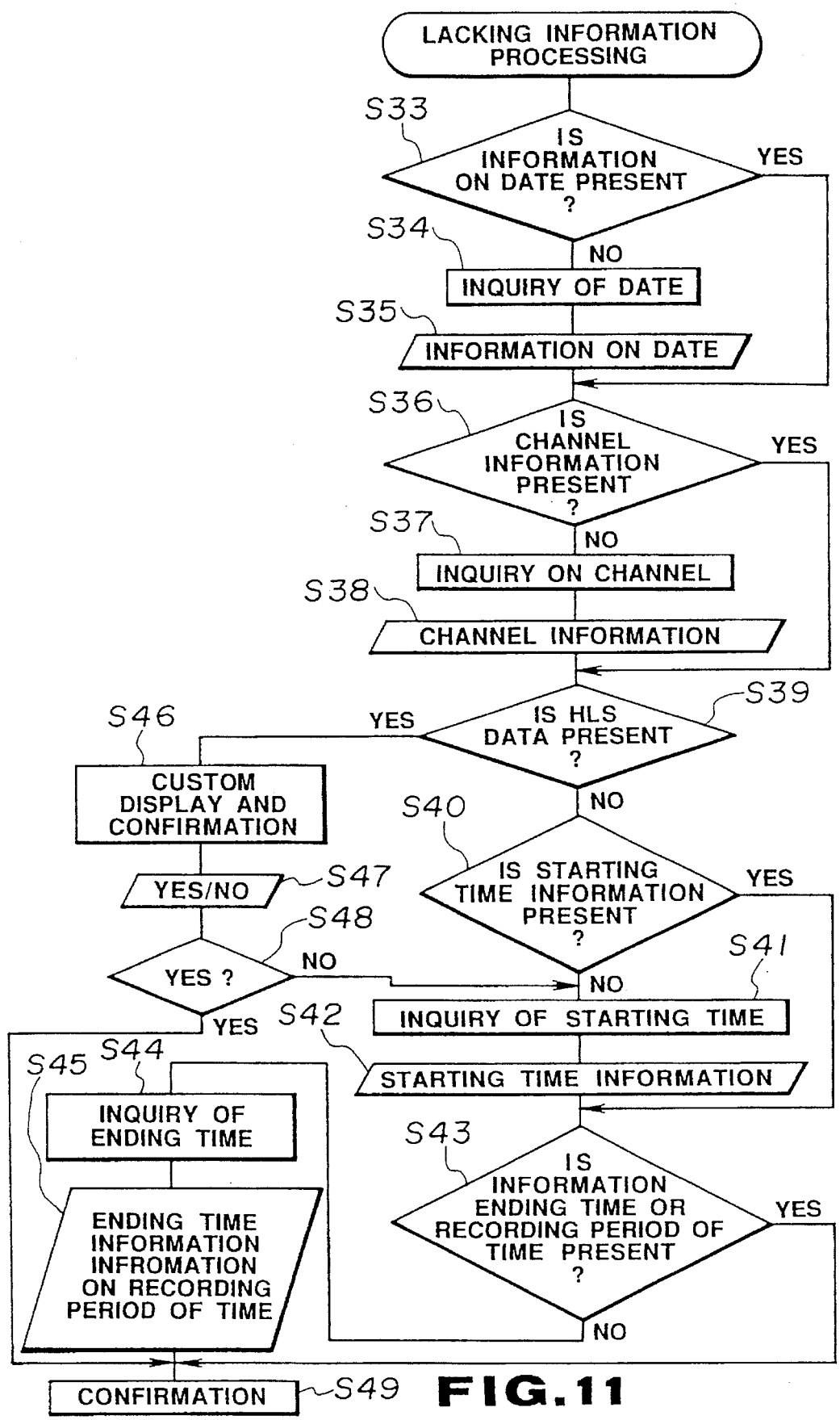
FIG. 11 is a flow chart showing the detail of a lacking information processing in the flow chart of FIG. 7.

FIG. 11 is a flow chart showing the detail of the processing of the lacking information step in FIG. 7. FIG. 7 shows each step in which presence or absence of various lacking information and inquiry are collected for simplicity of illustration. In FIG. 11, these are developed depending upon four items of the meaning frame and a step depending upon absence or presence of the elementary information (hereinafter referred to as HLS data) which is obtained by learning the custom is added.

In other words, in the processing for complementing the lacking information of FIG. 11, determination whether the item of the information on the data and the day of the week of the video recording is present or absent is made at the first step S33. If present or absent, the program step will proceed to the step S36 or S34, respectively. The data on the video recording to be reserved is inquired by the animation display and the voice of the animation character AC at step S34. The information on the date is inputted at step S35. Determination whether the item of the information on the channel of the video recording reservation is present or absent is made at step S36. If present or absent, the program step will proceed to step S36 or S37, respectively, which channel is to be selected is inquired at step S37. The information on the channel is inputted at step S38.

The present embodiment has a system (HLS) for learning the custom of making a reservation of the video recording in the VTR 40 by the operator. In the HLS system, when the information on the data and the channel (or only the date) are inputted, determination whether or not the information the date and the channel is the same as the data of customarily reserved video recording (HLS data) is made at step S39. If it is the HLS data, at least the starting and ending time of the customarily reserved program is displayed (and voice inputted) and whether or not the customary video recording reservation is made is confirmed at step S46. While such a display and confirmation are made, voice "Yes" or "No" is inputted at step S47. Determination whether or not the customary video recording to be made is made at step S48. If Yes or No, the program step will proceed to step S49 or S41, respectively.

If it is determined that the information on the data and the channel is not the customary HLS data, the program step will proceed to step S40. Determination whether the information on the starting time of the video recording is present or absent is made at step S40. If present or absent, the program step will proceed to step S43 and S41, respectively. What time is the starting time of the reserved video recording is inquired at the step S41. The information on the starting time is inputted at step S42. After the information on the starting time is inputted, determination whether the ending time of the reserved video recording or the recording period of time is present or absent is made at step S43. If present, the program step will proceed to step S49. If absent, the program step will proceed to step S44. An inquiry on what time is the ending time of the reserved video recording is made at step S44. The information on the ending time or the recording period of time is inputted at step S45. Display as shown in FIG. 9 (and a voice output "Is it OK?" is performed at step S49. Confirmation whether or not each item of the information for the video recording reservation which was inputted at each step is correct is made at step S49.

Figure 12:
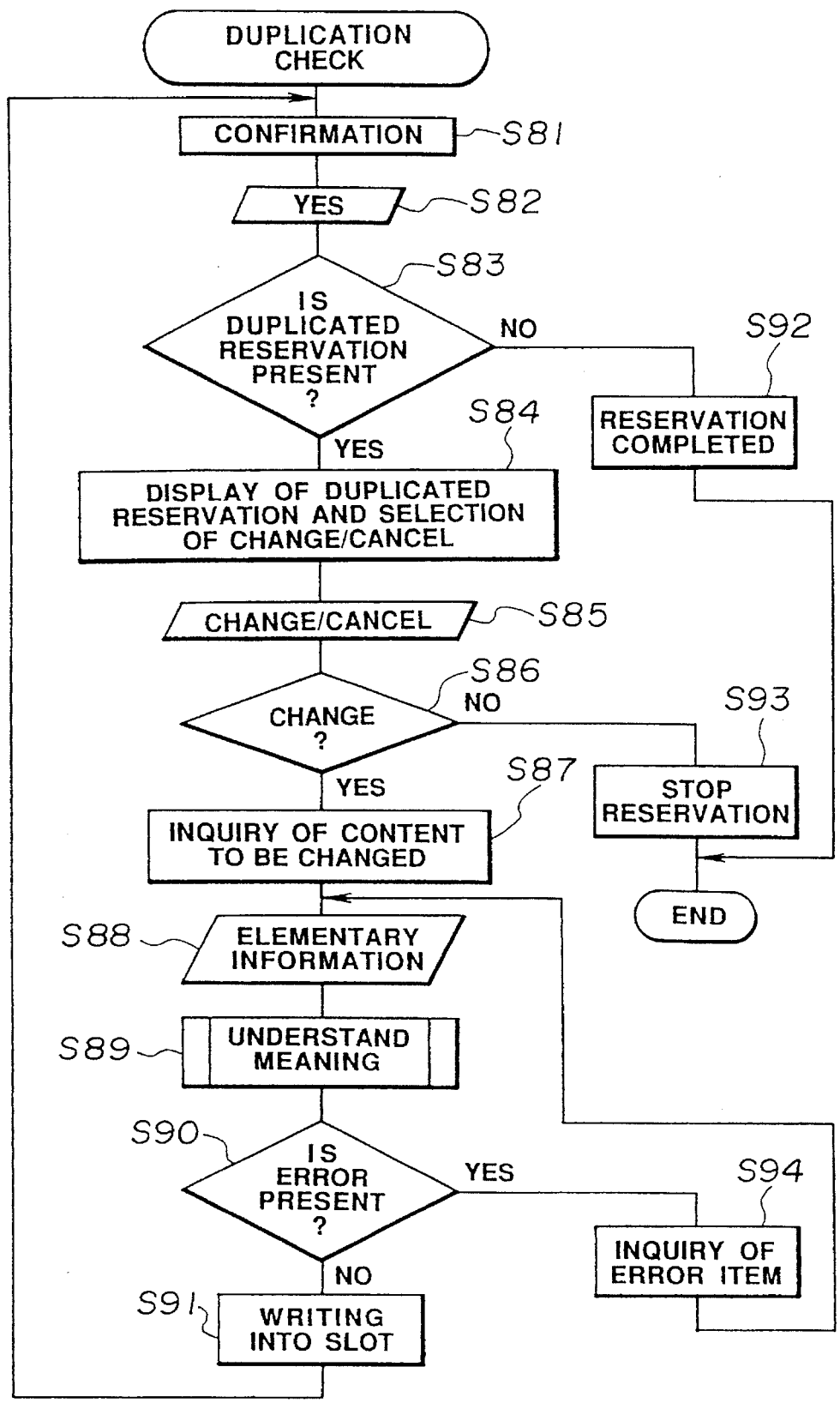
FIG. 12 is a flow chart showing the detail of a duplication check processing in the flow chart of FIG. 7.

FIG. 12 is a flow chart explaining the detail of the duplication checking processing at step S67 of FIG. 7. In FIG. 12, the above-mentioned reservation content is displayed for confirmation at step S81 (corresponding to the step S54 of FIG. 7). Yes is voice inputted to initiate the duplication confirmation processing at step S82 corresponding to steps S55 and S56 of FIG. 7). Accordingly, the step S83 and the subsequent steps correspond to the duplication processing of step S67 of FIG. 7.

Determination whether or not the information on the previous video recording reservation includes the reservation information in which time is duplicated is made at step S83 of FIG. 12. If No, reservation of video recording is completed and the processing is terminated at step S92. If Yes, the program step will proceed to step S84. Display of the duplicated video recording reservation and selection of change/cancel of the duplicated video recording reservation is carried out at step S84. Either of change/cancel is voice inputted at step S85. Determination whether or not the voice input is "change" is made at step S86. If No, the reservation of the video recording is stopped to terminate the processing at step S93. If Yes, the content of change is inquired at step S87. The elementary information is voice inputted at step S88. If the elementary information is inputted at step S88, the meaning analyzing processing is made at step S89. Determination whether or not an error of the meaning analysis of the voice input is present or absent is made at step S90. If present, the error item is inquired at step S94 and the program step will return to step S88. If it is determined that the error is absent at step S90, the program step will proceed to step S91. After carrying out the slot writing into corresponding information item of the meaning frame, the program step will return to step S81.

The error processing at steps S90 and S94 and the error processing at steps S77 and S79 are in principle performed whenever voice input is made. The errors to be processed mainly include a grammatical error in which mismatching occurs in the meaning analyzing routine and an input error in which designation of the elementary information is wrong (or the designation is not wrong, but is wrong for the specification of the VTR).

In case of the grammatical error, a message "Not understood. Please speak once more" is displayed and voice outputted. The apparatus is brought into a stand-by state.

In case of the input error, a message "Not understood. What date will you make a reservation?" or the starting time is the same as the ending time. "Please input the time again." which points out the error item of the inputted sentence to request a reinput is displayed or voice outputted so that the apparatus is brought into an input stand-by state.

Figure 13:
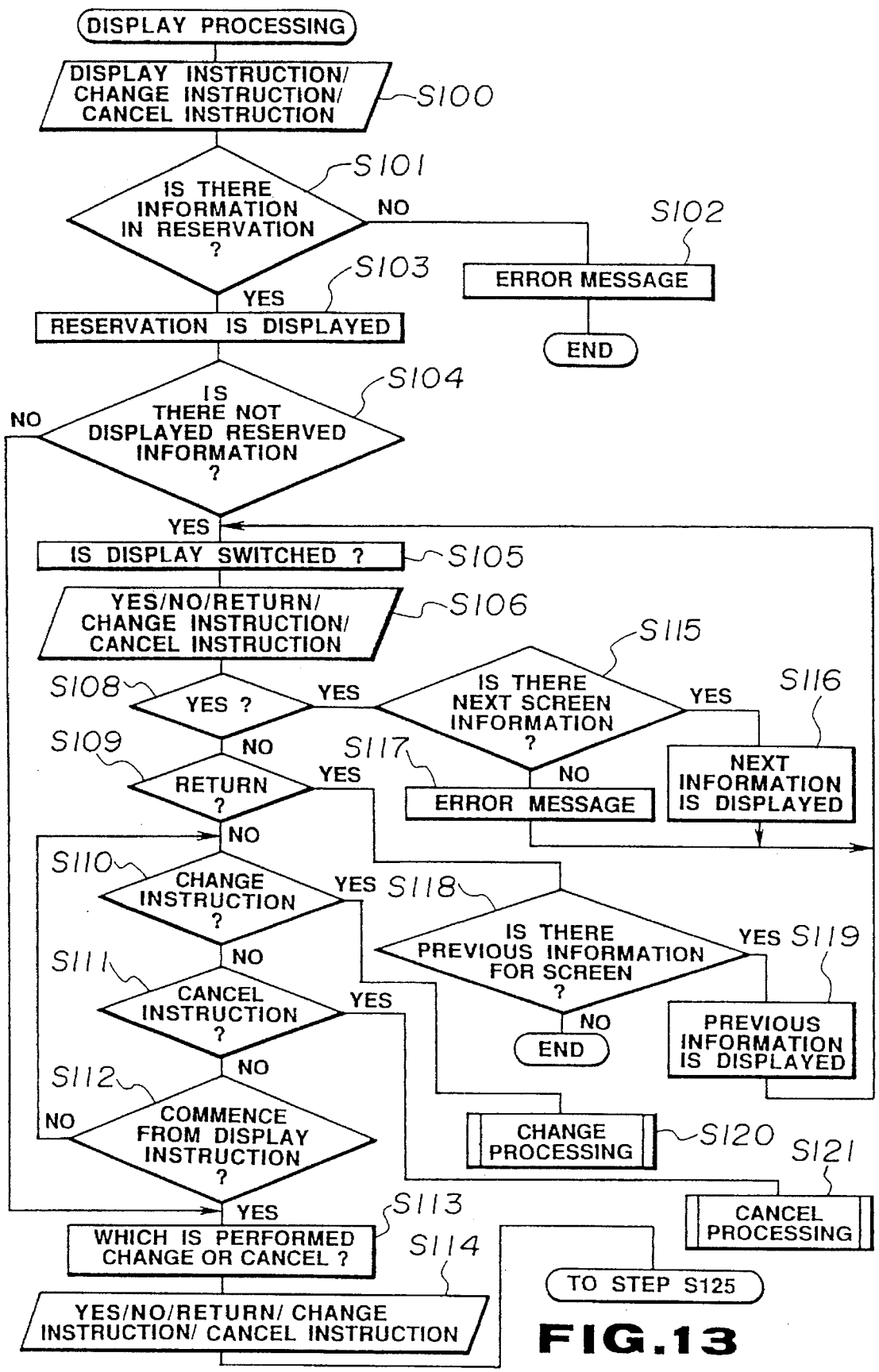
FIG. 13 is a flow chart showing the detail of a display processing in the flow chart in FIG. 6.
Figure 14:
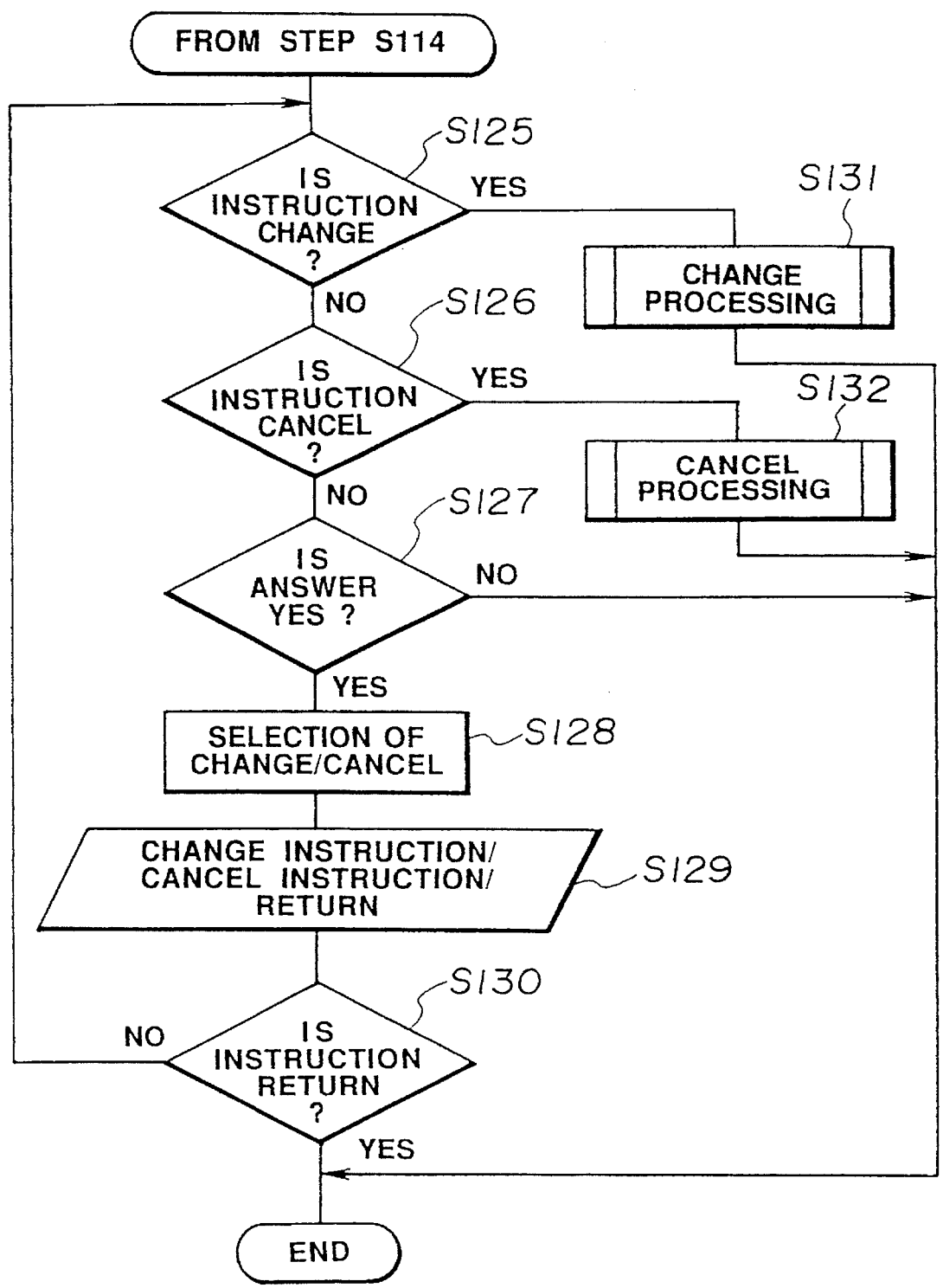
FIG. 14 is a flow chart following the flow chart of FIG. 13.

FIGS. 13 and 14 are flow charts explaining the detail of a display processing routine at step S19 of FIG. 6.

When the display processing at step S19 of FIG. 6 is commenced, voice input of a display instruction, change instruction and cancel instruction, etc. is performed at step S100 of FIG. 13. Determination whether or not there is information on the video recording reservation is made at step S101. If not, an error message representing that there is no reservation information to be displayed is displayed and voice outputted to terminate the processing. If it is determined that there is information on the video recording reservation at step S101. After the content of the video recording reservation is displayed at step S103, determination whether or not there is information on the reservation which has not been displayed is made at step S104. If it is determined at step S104 that there is no reservation information which has not been displayed, the program step will proceed to step S113. If it is determined at step S104 that there is reservation information, whether or not the screen of the CRT display 30 is switched is inquired at step S105. "Yes", "No" and "Return" by voice or instructions of change or cancel are inputted at step S106, determination whether or not the inputted voice is "Yes" is made at step S108. If it is determined Yes at step S108, the program step will proceed to step S115. Determination whether or not there is next information ready for the screen is made. If it is determined Yes at this step S115, the program step will proceed to step S116 at which next information is displayed on the screen and the program step will return to the step S105. If it is determined No at step S115, the program step will proceed to step S117 at which an error message is displayed and will return to step S105. If the determination at step S105 is No, the program step will proceed to step S109. Determination whether or not the voice input is "Return" is made at step S109. If Yes, the program step will proceed to step S118. Determination whether or not previous information is displayed on the screen is made at the steps 118. If Yes, the previous information is displayed on the screen at step S119 and the program step will return to step S105. If No, the processing is terminated. If the determination at the step S109 is No, the program step S110 will proceed to step S110. Determination whether or not the voice input is an instruction of change is made at step S110. If Yes, the change processing is performed at step S120. If No, the program step will proceed to step S111. Determination whether or not the voice input is an instruction of cancel is made at step S111. If Yes, the cancel processing is performed at step S121. If No, the program step will proceed to step S112. Determination whether or not these change and cancel processings are commenced from the instruction of display is made at step S121. If No, the program step will return to step S110. If Yes, the program step will proceed to step S113. Which is performed change or cancel is inquired at step S113 and voice "Yes", "No" and "Return" or a change instruction or cancel instruction is inputted at step S114.

If processing at step S114 of FIG. 13 is terminated, the program step will proceed to the step S125 shown in FIG. 14. Determination whether or not voice input at step S114 is an instruction of change is made at the step S125. If Yes, the processing is terminated after performing the processing for change at step S131. If No, the program step will proceed to step S126. Determination whether or not the voice input at step S114 is a cancel instruction is made at the step S126. If Yes, the processing is terminated after performing the cancel processing at step S132. If No, the program step will proceed to step S127. Determination whether or not the voice input at step S127 is "Yes" is made at step S127. If the determination is No, the processing is terminated. If the determination is Yes, the program step will proceed to step S128. Which is selected, change or cancel is inquired at the step S128 and the change instruction or cancel instruction or "Return" in voice is inputted at step S129. Thereafter, the program step will proceed to step S130. Determination whether or not the voice input is "Return" is made at this step. If Yes, the processing is terminated. If No, the program step will return to the step S125.

Figure 15:
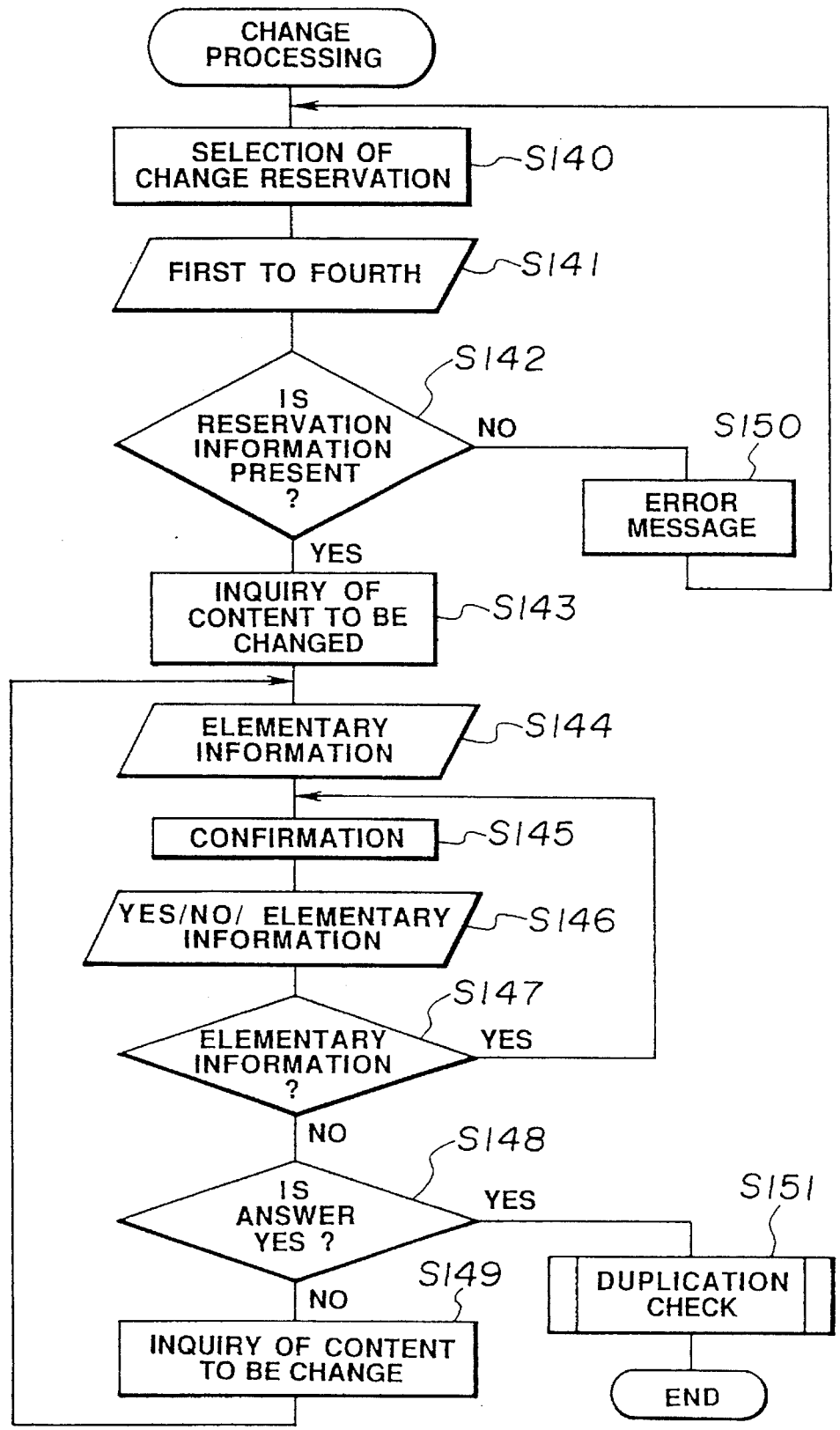
FIG. 15 is a flow chart showing the detail of a change processing in the flow chart of FIG. 6.

FIG. 15 is a flow chart explaining the detail of the change processing routine at step S21 of the flow chart of FIG. 6.

In FIG. 15, selection processing for video recording reservation is performed at step S140. Specifically, a schedule of the video recording reservation is displayed and a message inquiring which reservation is changed is displayed and voice outputted. If there are four content indicating columns in the displayed schedule, the video recording information in which column is to be changed is voice inputted, for example, first, . . . , fourth at next step S141. Determination whether or not the actual video recording reservation information is in the column which is specified by voice input is made at next step S142. If No at step S142, an error message is displayed at step S150 and the program step will return to step S140. If Yes, the program step will proceed to step S143.

The content to be changed of the designated video recording reserved content is inquired at step S143. The elementary information on the content to be changed is voice inputted at step S144. Confirmation processing of the video recording reserved content which has been changed by the elementary information is performed at step S145. "Yes", "No" or elementary information in voice is inputted at step S146. Determination whether or not the voice input at the step S146 is the elementary information is made at step S147. If Yes, the program step will return to step S145. If No, the program step will proceed to step S148. Determination whether or not the voice input is Yes is made at step S148. If Yes, the duplication check processing is performed at step S151 and then the processing is terminated. If the determination at the step S148 is No, the program step will return to step S144 after the content to be changed is inquired again at step S149.

Figure 16:
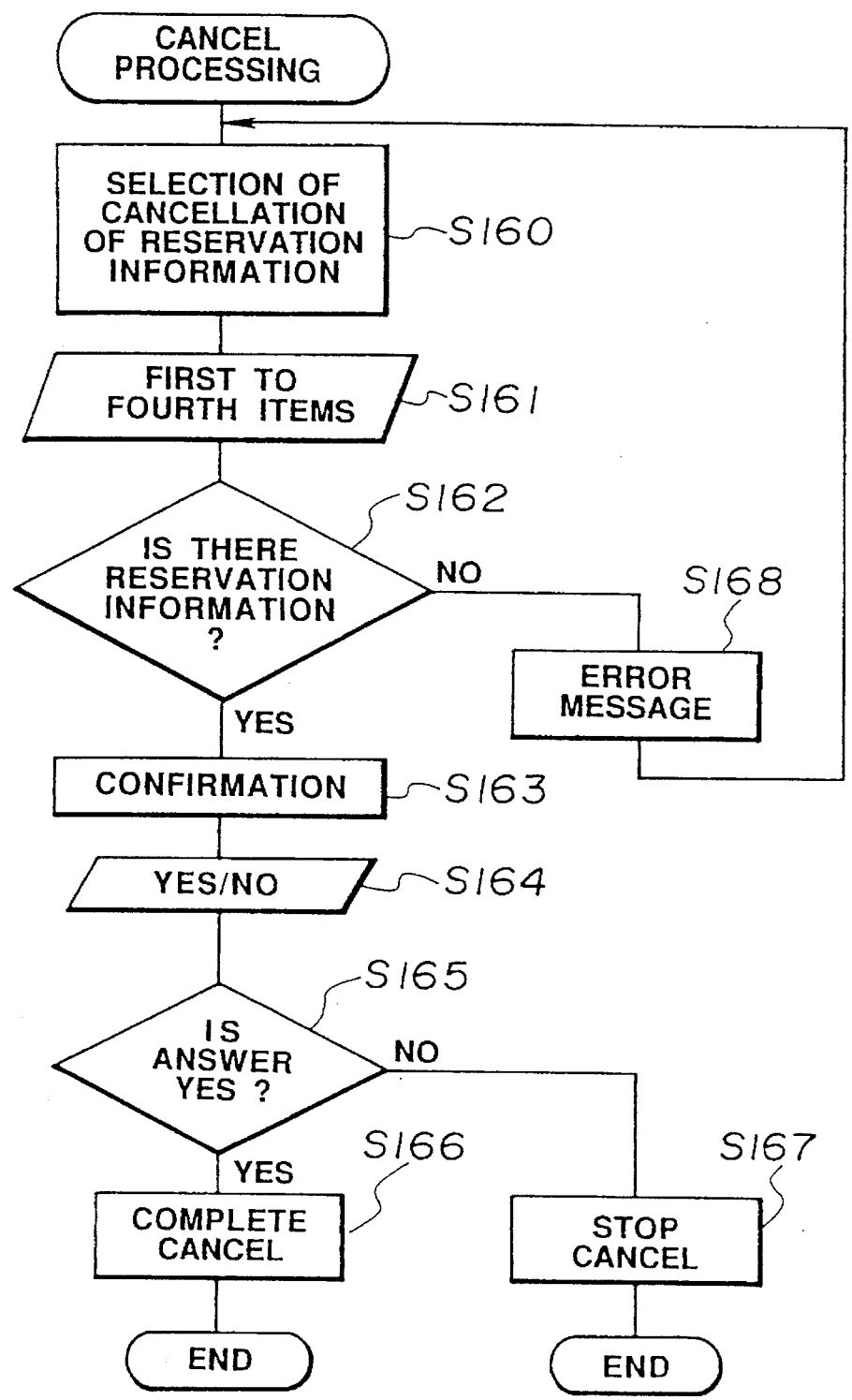
FIG. 16 is a flow chart showing the detail of a cancel processing in the flow chart of FIG. 6.

FIG. 16 is a flow chart explaining the detail of the cancel processing routine at step S23 of the flow chart of FIG. 6.

In FIG. 16, the video recording reservation information for cancellation is selected at step S160. Which item of video recording reservation information of four items of (the first to fourth) the recording reservation information should be canceled is voice inputted at step S161. Determination whether or not there are the first to fourth items of the video recording reservation information is made at step S162. If No at the step S162, an error message is outputted at step S168 and the program step will return to step S162. If Yes, the program step proceed to step S163. The processing at steps S160 to S162 in FIG. 16 is substantially identical with that at steps S140 to S142 in FIG. 15.

Next, confirmation processing for cancellation is performed at step 163. "Yes" or "No" is voice inputted at step S164. Determination whether or not the voice input is "Yes" is made at step S164. If the determination is Yes, the program sleep will proceed to step S166 at which the processing is terminated after completion of the cancellation. If No at step S165, the program step will proceed to step S167 at which the cancel processing is stopped to terminate the processing.

In the above mentioned video recording reservation or reservation confirmation (and change/cancel) phase, an input other than the requested answer is accepted and understood and is apparent from the steps S54 to S59 of FIG. 7, steps S105 to S111 of FIG. 13, steps S113 to S127 of FIG. 13, steps S145 to S148 of FIG. 15.

In other words, display shown in FIG. 9 (and the voice output) is performed at step S54 of FIG. 7 and an answer "Yes" or "No" is generally requested. It is determined "Yes" at step S58 by directly voice inputting the elementary information so that the program can proceed to the elementary information input, processing at step S52. And the program step can be shifted to a change processing by voice inputting "Change".

A message inquiry as to whether or not the display is switched is displayed and voice outputted at step S105 of FIG. 13. Although, "Yes" or "No" is usually answered, the program step can be shifted to the change processing step S120 and the cancel processing step S121 by directly inputting the change instruction and cancel instruction, respectively.

This aims at performing the optimum processing suitable for the inputted content by accepting an input other than the requested answer. In consideration of that an answer which is logically jumped from the words of the other person may be made by presuming the meaning from the context in usual conversation among human being. This enables the program to directly proceed to next input, step by omitting an answer "Yes" or "No". The simplification of the operation procedure can be achieved. Accordingly, a plurality of procedures to enter a give processing exists. For example, if the video recording reserved content is desired to change, it is an orthodox procedure to respond to each question that "No" is answered in response to a question "Is it OK?" on confirmation and then "Change" is instructed in response to a question "What can I help you with?" An instruction "Change" may be inputted on confirmation and the content to be changed may be directly inputted and the program step can be returned to a just previous information input, step by an instruction "Return". The program can flexibly respond to the various inputs by the operator. The elementary information of the item to be changed can be changed by directly inputting, for example, "Channel 6". An environment, or atmosphere of dialogue by natural language in which obvious matter cannot be expressly referred can be obtained as well as the simplification of the operation procedure.

Figure 17:
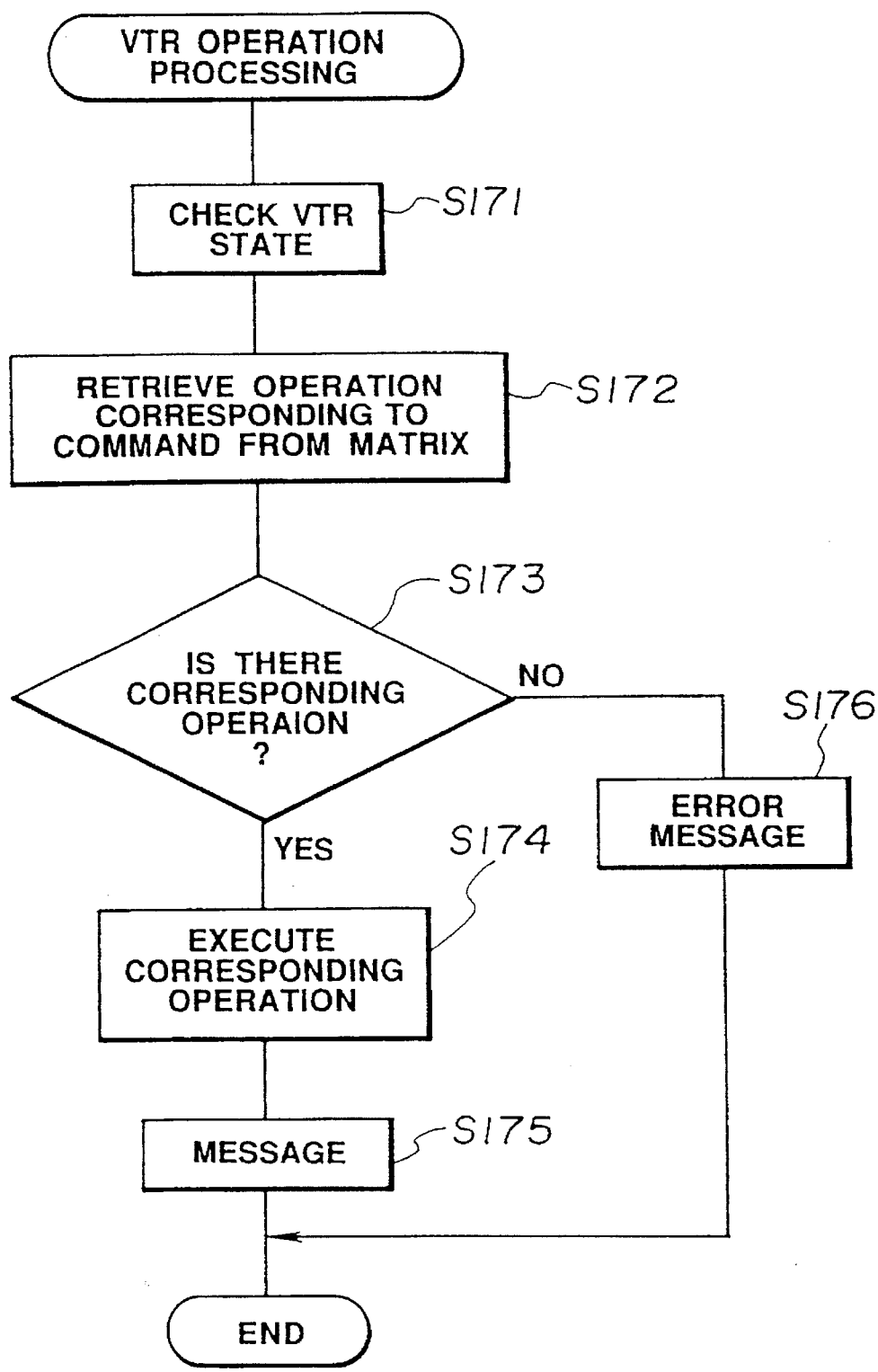
FIG. 17 is a flow chart showing the detail of a VTR operation processing in the flow chart of FIG. 6.

FIG. 17 is a flow chart explaining the detail of an operation processing routine of the VTR 40 at step S26 of FIG. 6.

In FIG. 17, the current mode of the VTR 40 is checked (for example, what the operation mode is) at step S171. The operation corresponding to a command responsive to an operation mode designating control signal is retrieved from a matrix (a table showing the relation between instructions and operations) for operation modes which will be described hereafter. A part of the matrix is shown in Table 1.

the review mode. If the current operation mode is the payback and cue modes, the operation mode is brought into the reverse playback mode. If the current operation mode is the rewind and review modes, it is brought into the fast feeding and the review modes, respectively. In such a manner, a correct operation depending upon the current operation mode is selected in response to the voice input "Fast" or "Return" having plural meanings.

Figure 18:
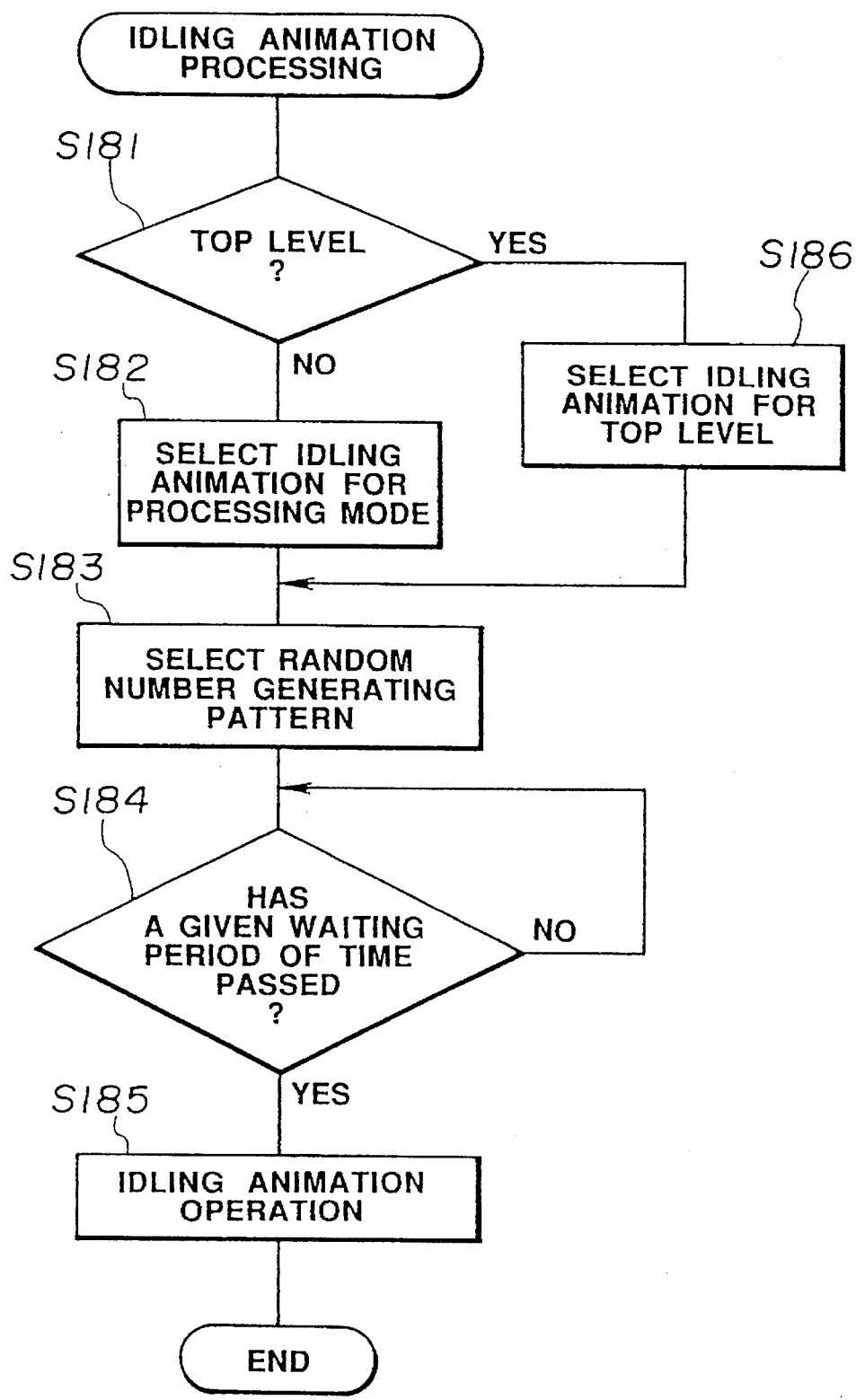
FIG. 18 is a flow chart showing the detail of an idling animation processing in the flow chart of FIG. 6.

FIG. 18 is a flow chart explaining the detail of the idling animation processing routine at step S14 of the flow chart of FIG. 6.

Determination whether or not the conversation is in the top level is made at step S181 of FIG. 18. The top level means the level of conversation in which the basic operation of the VTR 40 is (directly) performed or the apparatus is brought into the above mentioned reservation/confirmation phases. If it is determined Yes (the conversation is in the top level) at step S181, the idling animation image for the top level conversation is selected at step S186, the program step

TABLE 1

| | INSTRUCTION (VOICE INPUT) | | | |
|---|---|---|---|---|
| OPERATION MODE | POWER | PLAYBACK | FAST | RETURN |
| POWER OFF | POWER ON | PLAYBACK | — | — |
| NO TAPE | POWER OFF | — | — | — |
| STOP | POWER OFF | PLAYBACK | FAST FEEDING | REVIEW |
| PLAYBACK | POWER OFF | PLAYBACK | CUE | REVERSE PLAYBACK |
| FAST FEEDING | POWER OFF | PLAYBACK | FAST FORWARD | REVIEW |
| REWIND | POWER OFF | PLAYBACK | REVIEW | FAST FEEDING |
| CUE | POWER OFF | PLAYBACK | FAST FEEDING | REVERSE PLAYBACK |
| REVIEW | POWER OFF | PLAYBACK | REWIND | PLAYBACK |
| RECORDING | — | — | — | — |
| PAUSE | POWER OFF | PLAYBACK | CUE | REVIEW |
| RECORDING PAUSE | — | PLAYBACK | — | — |

Determination whether or not there is a corresponding operation in the matrix is made in next step S173. If No, an error message is outputted to terminate the processing at step S176. If Yes at step S173, the program step will proceed to step S174 in which an operation corresponding to the command is executed. Thereafter, a message that an operation will be executed or has been executed is outputted to terminate the processing at step S175.

Table 1 shows an example in which the operation mode is to be shifted if an instruction by the voice input is outputted in the current operation mode. That is, an instruction "Power" is voice inputted when the current operation mode is, for example, a power off mode, the operation mode is brought into a power-on operation mode. If an instruction "Playback" is voice inputted when the current operation mode is a power oft and stop mode, the operation mode is brought into a playback mode. If an instruction "Fast" is voice inputted when the current operation mode is, for example, stop, fast feeding, and cue modes, the operation mode is brought into a fast feeding mode. If the current mode is playback and pause modes, the operation mode is brought into the cue mode. If the current mode is the rewind and review modes, the operation mode is brought into the review and rewind mode, respectively. If "Return" is voice inputted when the current operation mode is the stop, fast feeding and pause modes, the operation mode is brought into will proceed to step S183. If it is determined No at step S181, the idling animation image for the processing mode in each phase is selected at step S182. It is possible to preset various idling animation video image for the top level and the processing mode. For example, idling action in which the animation character AC yawns, leans on the edge of the screen, scratches his own head, or lies down, may be performed as mentioned above. After any one of the actions of the idling animation images is selected by the random number generation, the program step will proceed to step S184. Determination whether or not a given period of the waiting time in which there is no voice input has passed is made at step S184. If No, this determination is repeated. If Yes, the program step will proceed to step S185. The idling animation image of the selected pattern is displayed on the screen SC of the CRT display 30. That is, an action representing that the animation character AC is idling is performed.

In order to make the response of the animation character AC more familiar, it is preferable to make some response to a voice input which is not related with operation mode designation of the equipment. Specifically, "Can I help you?" is answered in response to the voice input "Hey". An animation image in which the character AC is shy is displayed simultaneously with a reply "I am embarrassed" in response to voice input "Wonderful!".

An interface between the control circuit 15 of FIG. 1 and the animation character generating circuit 16 or the voice synthesizing circuit 19 is implemented by a message packet kip having a given structure. An example of the message packet kip may comprise three elements such as a message type representing the kind of the message, the message number corresponding to each content of the message, and the status. The message type indicates any of a message with no input (refer to FIGS. 3 and 8), a message with an input (refer to FIG. 9), a scheduler packet, a list (a schedule of the reserved content) and a duplication list. The message number can specify any of 256 messages when 8 bits are used. That is, the control circuit 15 selects an appropriate message type or kind (content) depending upon the recognition data of the inputted voice and the current status and puts the message type and the message number into the message packet MP for feeding them to the animation character generating circuit 16 and the voice synthesizing circuit 19. The animation character generating circuit 16 and the voice synthesizing circuit 19 displays the moving mouth of the animation character and characters of the message and voice synthesizes the message corresponding to the message number in the fed message packet MP, respectively.

It is necessary to preliminarily prepare a plurality of messages in order to perform the display and voice output of the message via the message number. One message among the plurality of messages is selected for display and voice output. Alternatively, the message per se may be composed by the control circuit 15 and the composed message may be fed by one character by one character for display and voice synthesizing.

The natural language input processing will now be described.

When the video recording is reserved, an inference of the lacking item of the time information is conducted using common sense. For example, when only minute is designated on input of starting time, the hour is inferred from the current time. When the hour and minutes are designated on input of the ending time, this is determined as the video recording period of time from the starting time. When a plurality of elementary information is inputted, half past 8 to just 9 o'clock is inferred in response to a voice input, for example, thirty minutes, until 9 o'clock in consideration of the relation between "from" and "until". If the current hour is 10 minutes after eight o'clock, 30 minutes from eight o'clock to 30 minutes past 9 o'clock is inferred in response to a voice input "one hour from 30 minutes".

It is to be understood that the present invention is not limited to only the foregoing embodiments. The voice inputting means may be a hand microphone in lieu of the handset. A remote control unit may be provided with a small size microphone. The hand microphone or remote control unit may be provided with a switch (press-to-talk switch). The controlled electronic equipment is not limited to only VTR, but is applicable to a control for various devices such as disk recording and/or playback apparatus and digital or analog audio tape recorder.

What is claimed is:

1. A control apparatus for controlling electronic equipment and for designating and controlling an operation mode thereof, comprising:

an acoustic-electric transducer for receiving spoken instructions from a user designating the operation mode and for outputting an electric speech signal in response thereto;

speech recognition means receiving the electric speech signal output from the acoustic-electric transducer for recognizing words in the electric speech signal and outputting a signal corresponding to the recognized words;

animation character generating means for producing a video signal of an animation character who is a message speaker that interacts with the user;

video image display means for displaying the video signal from the animation character generating means;

speech synthesizing means for synthesizing a speech signal of a message spoken by the animation character;

speech outputting means for transmitting the speech signal from the speech synthesizing means in audible human sounds; and a microprocessor responsive to the output signal from the speech recognition means for producing an operation mode designation and control signal for designating the operation mode of the electronic equipment and controlling the electronic equipment to operate in the designated mode, an action control signal fed to the animation character generating means for controlling the action of the animation character, and a message signal fed to the speech synthesizing means instructing a message signal to be synthesized in the speech synthesizing means, wherein the microprocessor performs natural language or dialogue inference processing of the output signal from the speech recognition means.

2. A control apparatus for controlling electronic equipment as defined in claim 1, wherein the electronic equipment is a video tape recorder and the operation mode is a video recording reservation mode, and wherein the microprocessor detects if a normal reserved video recording is impossible due to a conflict in a reservation date or a reservation channel and a detected conflict causes the microprocessor to control the animation character to request a reinput from the user of the control apparatus and to bring the video tape recorder into an input stand-by state until the user provides the reinput.

3. A control apparatus for controlling electronic equipment as defined in claim 1, wherein the microprocessor detects if a new input has a content different from a content of a currently requested input in response to the new input.

4. A control apparatus for controlling electronic equipment as defined in claim 1, wherein the microprocessor selects and outputs one control instruction appropriate for a current operation mode of the electronic equipment from among a plurality of control instructions in response to an instruction supplementing the operation mode recognized by the speech recognition means, such that a selection made by the microprocessor corresponds to a user selection following a request from the animation character to the user for an instruction supplementing the operation mode.

5. A control apparatus for controlling electronic equipment as defined in claim 4, wherein the electronic equipment is a video tape recorder and when the instruction supplementing the operation mode recognized by the speech recognition means is a word meaning "Fast" and a current operation mode of the video tape recorder is a "stop" or "playback" mode, the microprocessor brings the video tape recorder into a "fast feeding" mode or "fast playback" mode, respectively.

6. A control apparatus for controlling electronic equipment as defined in claim 4, wherein the electronic equipment is a video tape recorder and when the instruction supplementing the operation mode recognized by the speech recognition means is a word meaning "Return" and a current operation mode of the video tape recorder is a "stop" or "playback" mode, the microprocessor brings the video tape recorder into a "rewind" mode or "reverse playback" mode, respectively.

7. A control apparatus for controlling electronic equipment as defined in claim 1, wherein the video display means displays an animation character and a balloon on a screen thereof for displaying a message being spoken by the animation character.

8. A control apparatus for controlling electronic equipment as defined in claim 7, wherein the video display means further includes a superimposer for superimposing the animation character upon a reproduced or broadcast video image.

9. A control apparatus for controlling electronic equipment as defined in claim 1, wherein the acoustic-electric transducer includes a switch for designating a speech input state and in which the speech input is divided by turning the switch on and off.

10. An apparatus for designating and controlling an operation mode of electronic equipment, comprising:

- speech transducer means for receiving spoken instructions from a user designating the operation mode and for outputting an electric speech signal in response thereto;

- speech recognition means receiving the electric speech signal output from the speech transducer means for recognizing words in the electric speech signal and outputting a signal corresponding to the recognized words,

- the speech recognition means including an analog interface for setting the electric speech signal to a particular level in response to control data supplied from a system controller and an operational processor for receiving the leveled electric speech signal from the analog interface for forming a voice pattern by frequency analyzing the leveled electric speech signal, and for correcting, by time axis normalization, a time distortion of the voice pattern due to changes in speaking speed of spoken instructions, and for comparing the time axis normalized voice pattern with a plurality of patterns stored in a pattern storing memory;

- animation character generating means for producing a video signal of an animation character who is a message speaker that interacts with the user;

- video image display means for displaying the video signal from the animation character generating means;

- speech synthesizing means for synthesizing a speech signal of a message spoken by the animation character;

- speech outputting means for transmitting the speech signal from the speech synthesizing means in audible human sounds; and

- a microprocessor responsive to the output signal from the speech recognition means for producing an operation mode designation and control signal for designating the operation mode of the electronic equipment and controlling the electronic equipment to operate in the designated mode, an action control signal fed to the animation character generating means for controlling the action of the animation character, and a message signal fed to the speech synthesizing means instructing a message signal to be synthesized in the speech synthesizing means, wherein the microprocessor performs natural language or dialogue inference processing of the output signal from the speech recognition means.

* * * * *